(12) United States Patent
Touyama et al.

(10) Patent No.: US 11,430,437 B2
(45) Date of Patent: Aug. 30, 2022

(54) INFORMATION PROCESSOR AND INFORMATION PROCESSING METHOD

(71) Applicant: SONY CORPORATION, Tokyo (JP)

(72) Inventors: Keisuke Touyama, Tokyo (JP); Junki Ohmura, Tokyo (JP); Hiroaki Ogawa, Chiba (JP); Kana Nishikawa, Tokyo (JP); Shinobu Kuriya, Kanagawa (JP); Yasushi Tsuruta, Tokyo (JP)

(73) Assignee: SONY CORPORATION, Tokyo (JP)

( * ) Notice: Subject to any disclaimer, the term of this patent is extended or adjusted under 35 U.S.C. 154(b) by 178 days.

(21) Appl. No.: 16/633,361

(22) PCT Filed: Jul. 18, 2018

(86) PCT No.: PCT/JP2018/026824
§ 371 (c)(1),
(2) Date: Jan. 23, 2020

(87) PCT Pub. No.: WO2019/026617
PCT Pub. Date: Feb. 7, 2019

(65) Prior Publication Data
US 2020/0152191 A1    May 14, 2020

(30) Foreign Application Priority Data
Aug. 1, 2017  (JP) .............................. JP2017-149134

(51) Int. Cl.
*G06F 3/16*    (2006.01)
*G10L 15/24*   (2013.01)
(Continued)

(52) U.S. Cl.
CPC .............. *G10L 15/22* (2013.01); *G06F 3/167* (2013.01); *G10L 25/84* (2013.01); *G10L 2015/223* (2013.01); *G10L 2015/225* (2013.01)

(58) Field of Classification Search
USPC .......................................... 704/1–9, 200–274
See application file for complete search history.

(56) References Cited

U.S. PATENT DOCUMENTS

| 8,412,715 B2 * | 4/2013 | Asano .................... G06F 40/30 |
| | | 707/758 |
| 10,636,414 B2 * | 4/2020 | Tsunoo ................... G10L 15/32 |

(Continued)

FOREIGN PATENT DOCUMENTS

| CN | 106133776 A | 11/2016 |
| EP | 3123430 A1 | 2/2017 |

(Continued)

OTHER PUBLICATIONS

International Search Report and Written Opinion of PCT Application No. PCT/JP2018/026824, dated Oct. 2, 2018, 08 pages of ISRWO.

(Continued)

*Primary Examiner* — Marcellus J Augustin
(74) *Attorney, Agent, or Firm* — Chip Law Group

(57) ABSTRACT

The present technology relates to an information processor and an information processing method that enable presentation of a response to a user with an appropriate amount of information in a voice interaction system. Provision of an information processor including a processing unit that adjusts an amount of information in a response with respect to desired information of a user, in accordance with a certainty factor of the user himself/herself that is estimated for the desired information makes it is possible to present the response to the user with the appropriate amount of information in the voice interaction system. The present technology is applicable to a voice interaction system, for example.

11 Claims, 21 Drawing Sheets

(51) Int. Cl.
 *G10L 17/00* (2013.01)
 *G10L 15/22* (2006.01)
 *G10L 25/84* (2013.01)

(56) References Cited

U.S. PATENT DOCUMENTS

| | | | |
|---|---|---|---|
| 2005/0171741 A1 | 8/2005 | Doi | |
| 2008/0235017 A1 | 9/2008 | Satomura | |
| 2012/0030006 A1* | 2/2012 | Yoder | G06Q 30/0207 |
| | | | 705/14.41 |
| 2014/0303957 A1* | 10/2014 | Lee | G10L 15/10 |
| | | | 704/2 |
| 2015/0278210 A1 | 10/2015 | Novotny et al. | |
| 2015/0348548 A1* | 12/2015 | Piernot | G10L 15/26 |
| | | | 704/235 |
| 2016/0210985 A1* | 7/2016 | Deleeuw | G10L 15/22 |
| 2017/0132312 A1* | 5/2017 | Tachibana | G10L 15/22 |
| 2017/0344887 A1* | 11/2017 | Ahmed | H04L 67/02 |
| 2018/0204570 A1* | 7/2018 | Puranik | G10L 15/24 |
| 2018/0232563 A1* | 8/2018 | Albadawi | G06K 9/00348 |
| 2019/0189124 A1* | 6/2019 | Tsunoo | G10L 15/04 |

FOREIGN PATENT DOCUMENTS

| | | |
|---|---|---|
| JP | 2005-062963 A | 3/2005 |
| JP | 2005-199373 A | 7/2005 |
| JP | 2008-233678 A | 10/2008 |
| JP | 2011-054088 A | 3/2011 |
| JP | 2017-515199 A | 6/2017 |
| KR | 10-2016-0138073 A | 12/2016 |
| WO | 2015/148583 A1 | 10/2015 |
| WO | 2017/090115 A1 | 6/2017 |

OTHER PUBLICATIONS

Office Action for EP Patent Application No. 18841713.3, dated Apr. 1, 2021, 09 pages of Office Action.

Jynto, et al, "Virtual Assistant", Wikipedia, Jul. 29, 2017, pp. 04.

* cited by examiner

[FIG. 1]
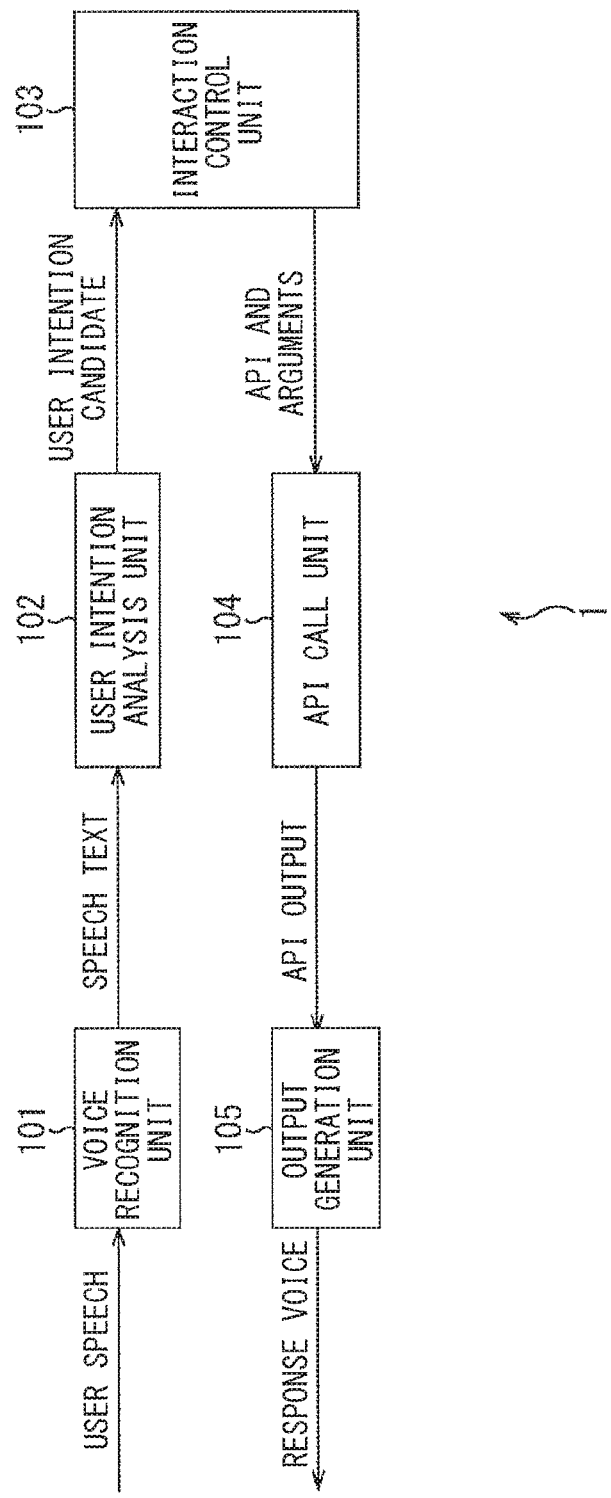

[FIG. 2]
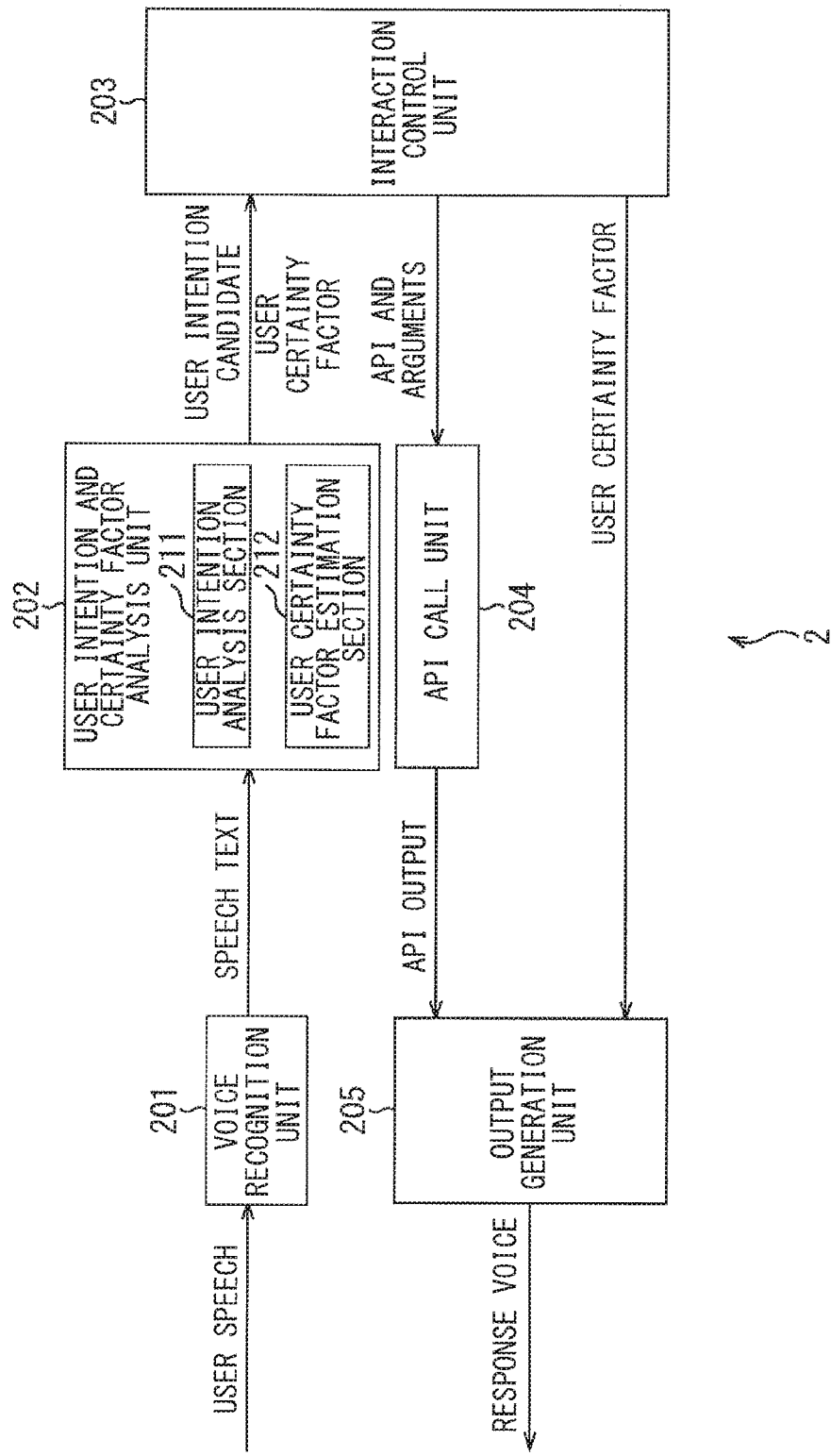

[FIG. 3]
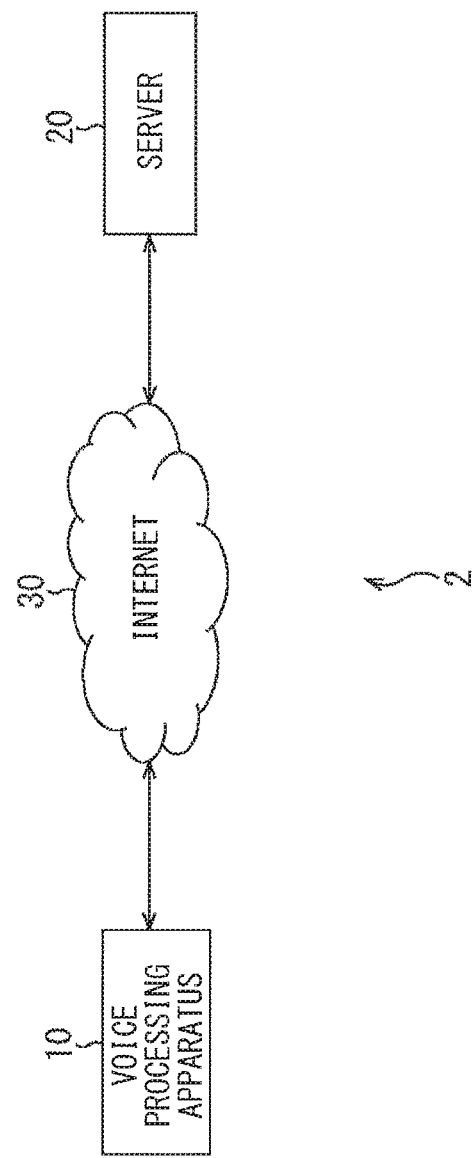

[FIG. 4]
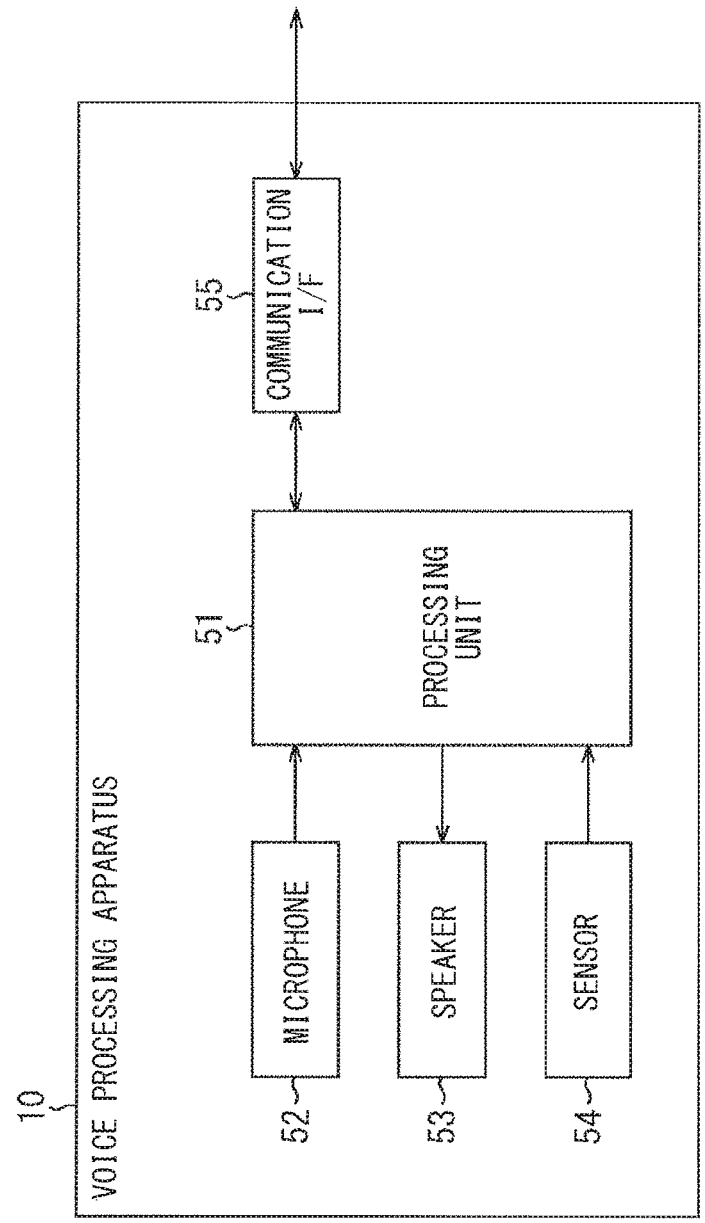

[FIG. 5]
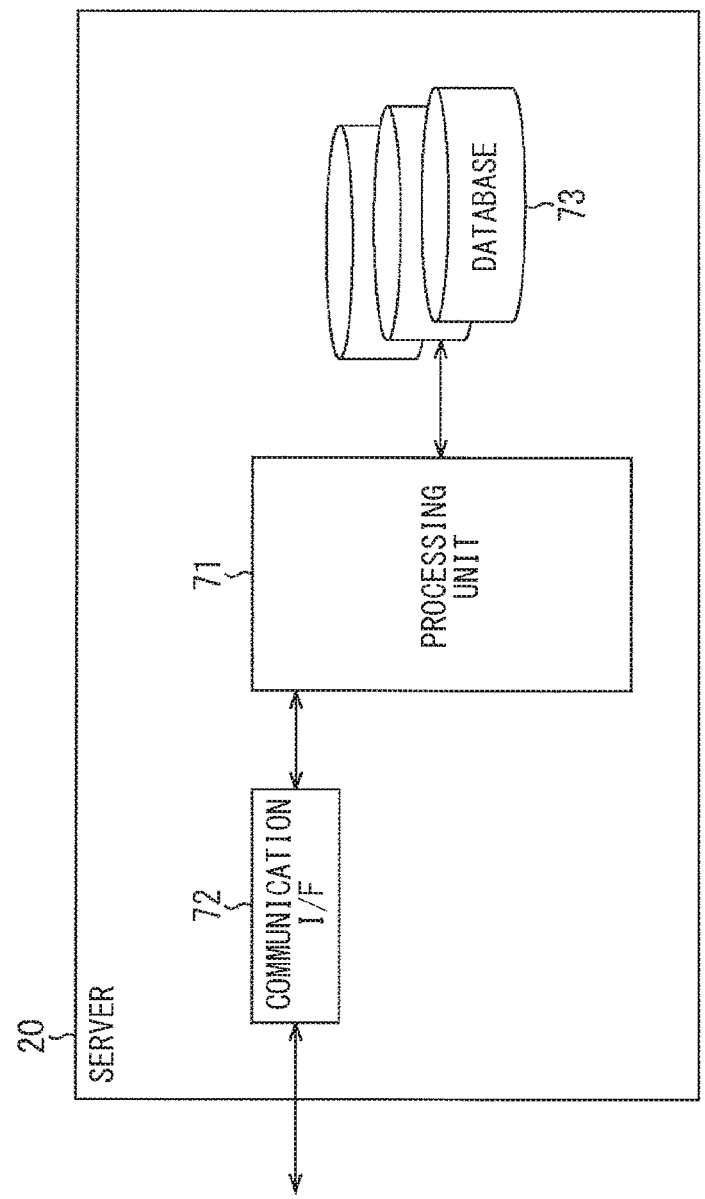

[FIG. 6]

| TITLE | DATE AND TIME | LOCATION | TARGET PERSON |
|---|---|---|---|
| MEETING | MARCH 23, 2017 10 AM | MAIN CONFERENCE ROOM | DAD |
| SHOPPING | MARCH 23, 2017 5 PM | SHIBUYA | DAD |

[FIG. 7]
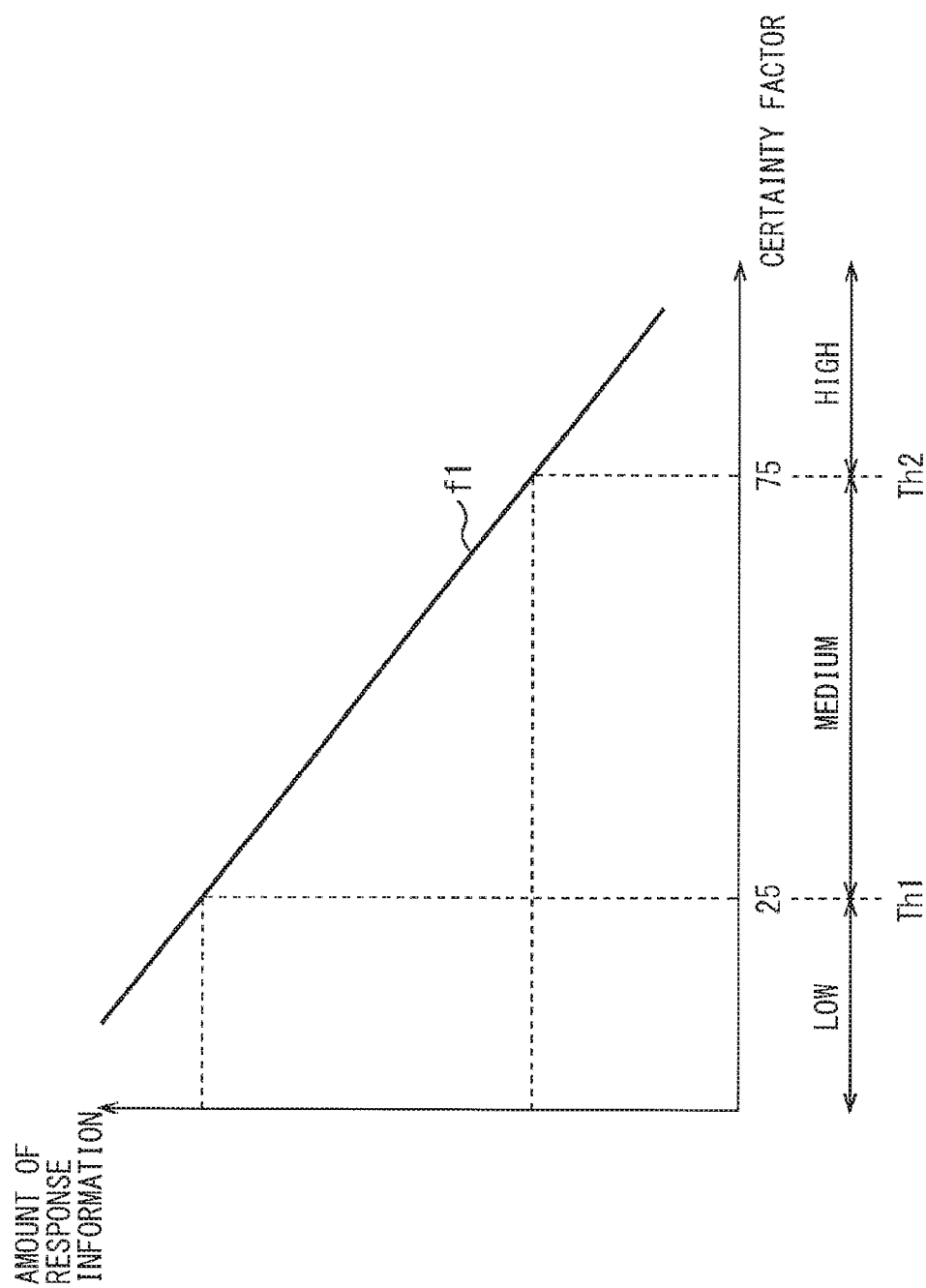

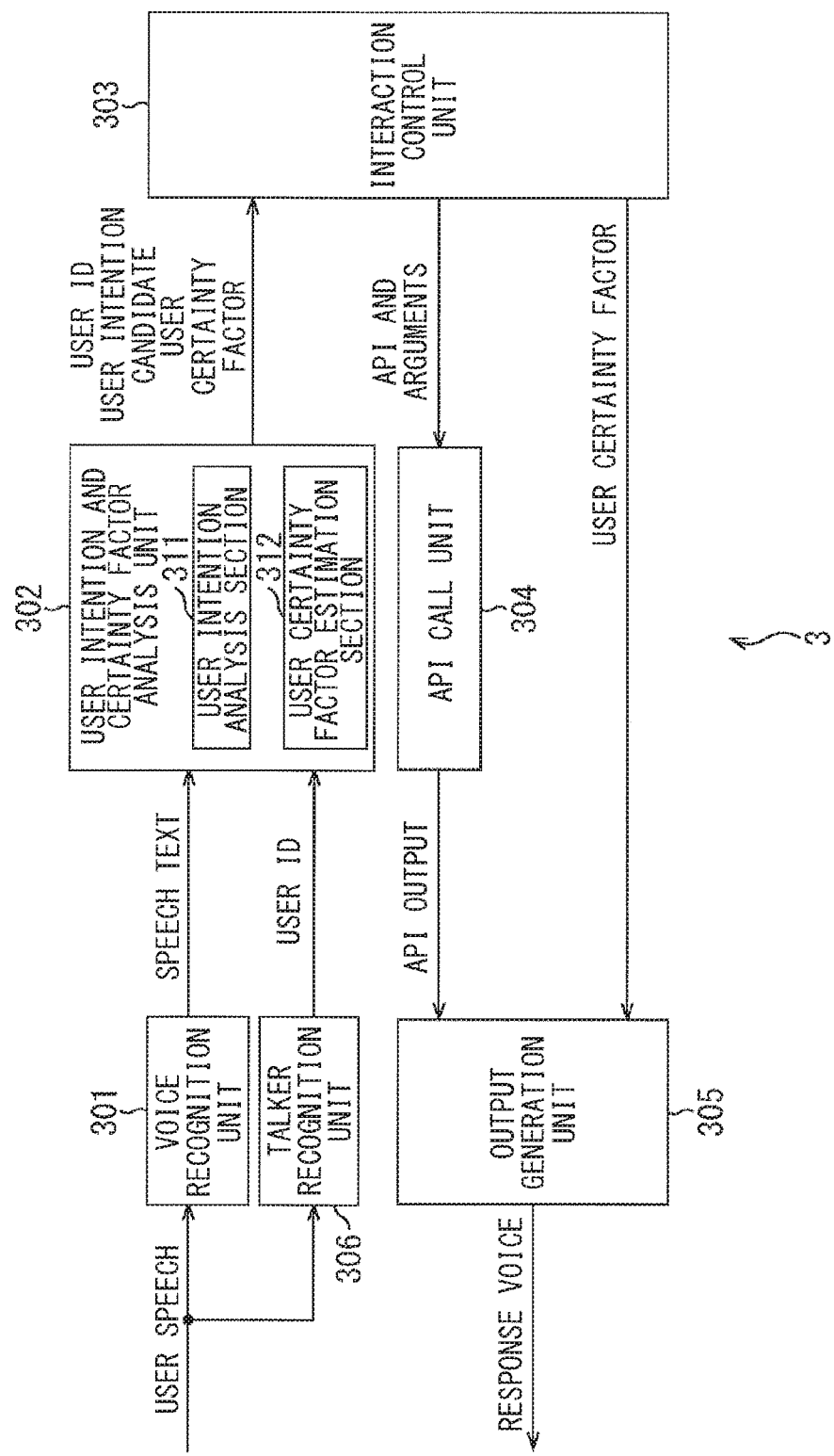
[FIG. 8]

[FIG. 9]

| TITLE | DATE AND TIME | LOCATION | TARGET PERSON |
|---|---|---|---|
| MEETING | MARCH 23, 2017 10 AM | MAIN CONFERENCE ROOM | DAD |
| SHOPPING | MARCH 23, 2017 10 AM | SHINJUKU | MOM |
| DENTIST | MARCH 23, 2017 3 PM | YOYOGI | DAD |
| SHOPPING | MARCH 23, 2017 5 PM | SHIBUYA | DAD |
| ALUMNI REUNION | MARCH 23, 2017 5 PM | HARAJUKU | MOM |

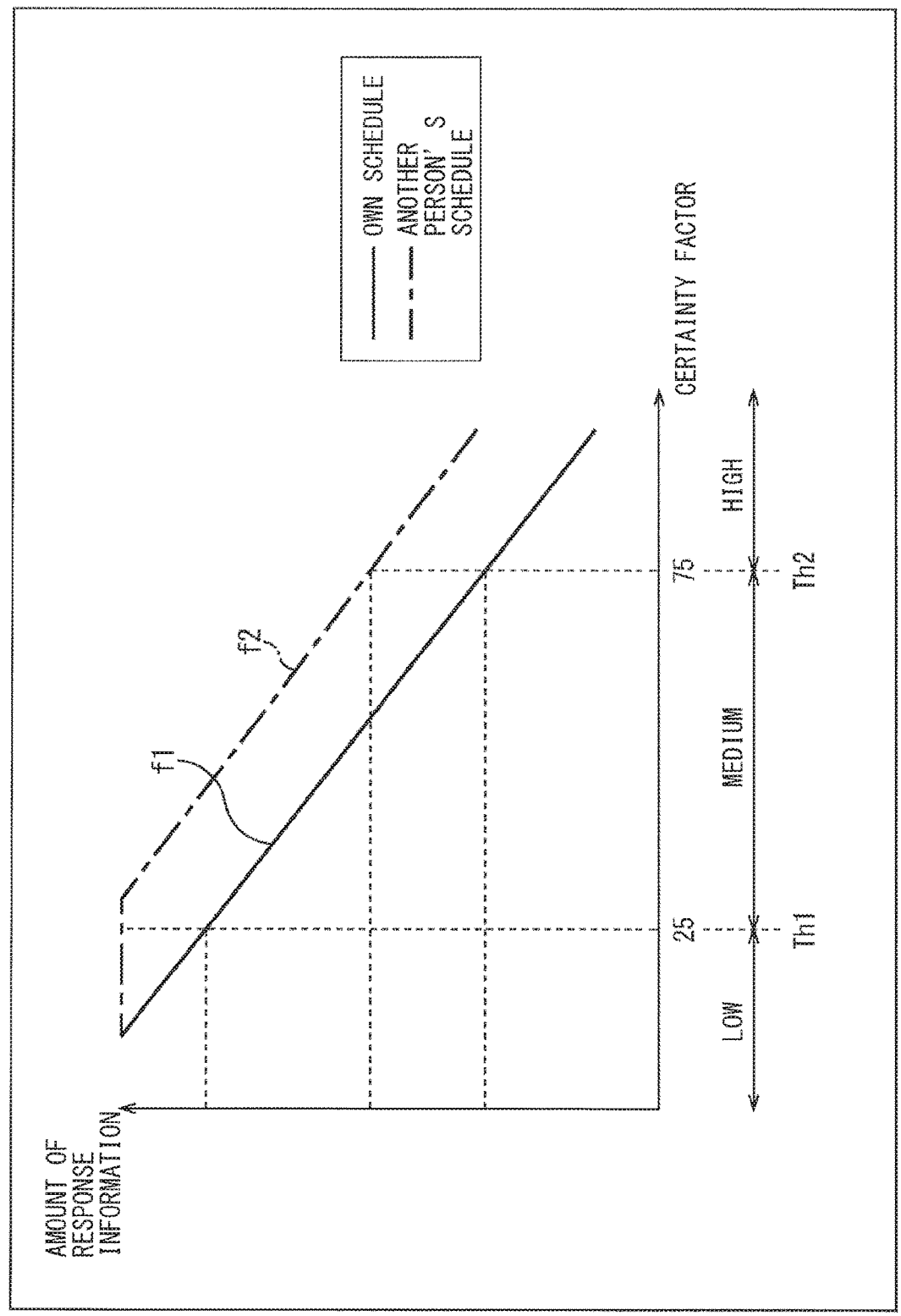
[FIG. 10]

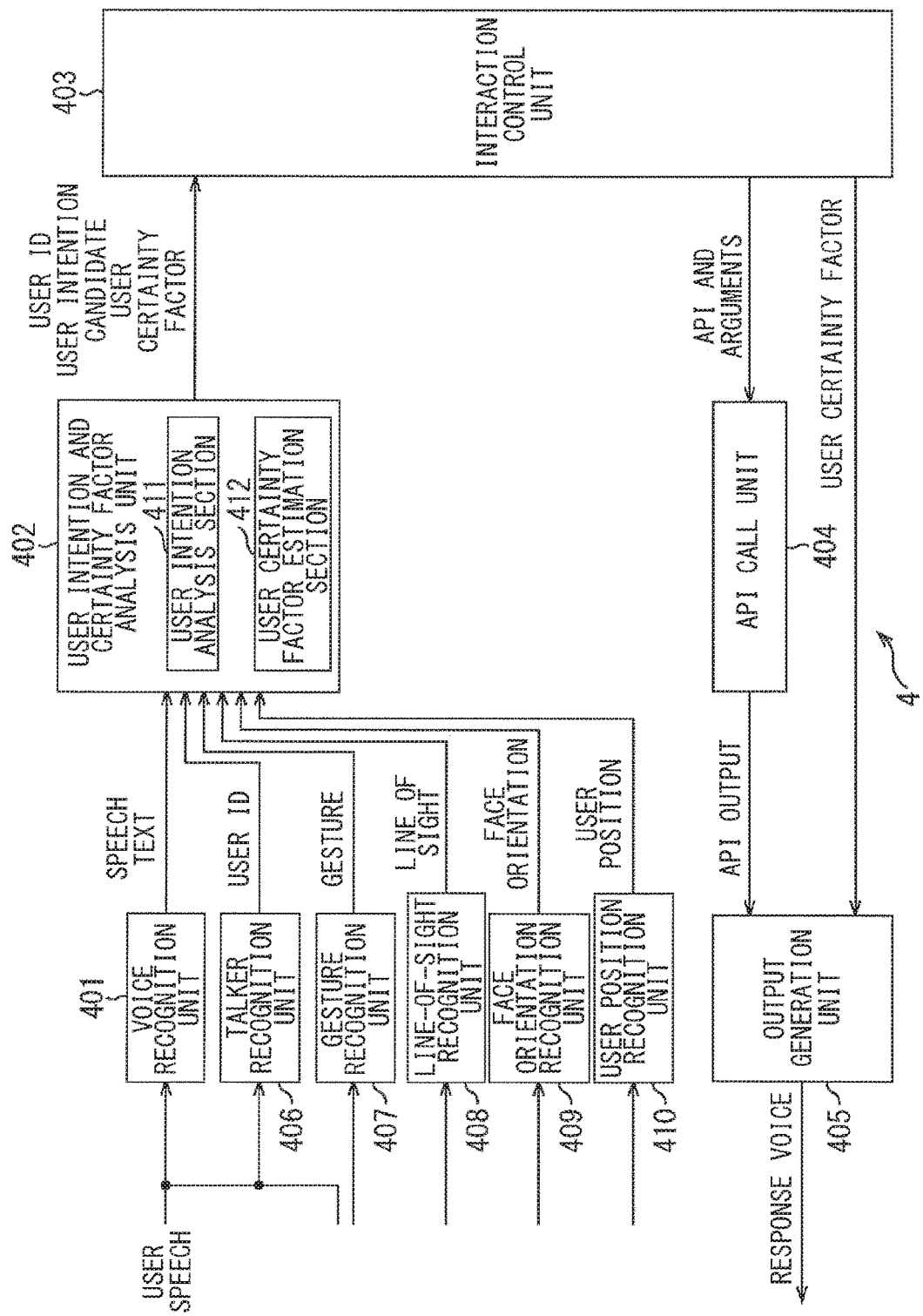
[FIG. 11]

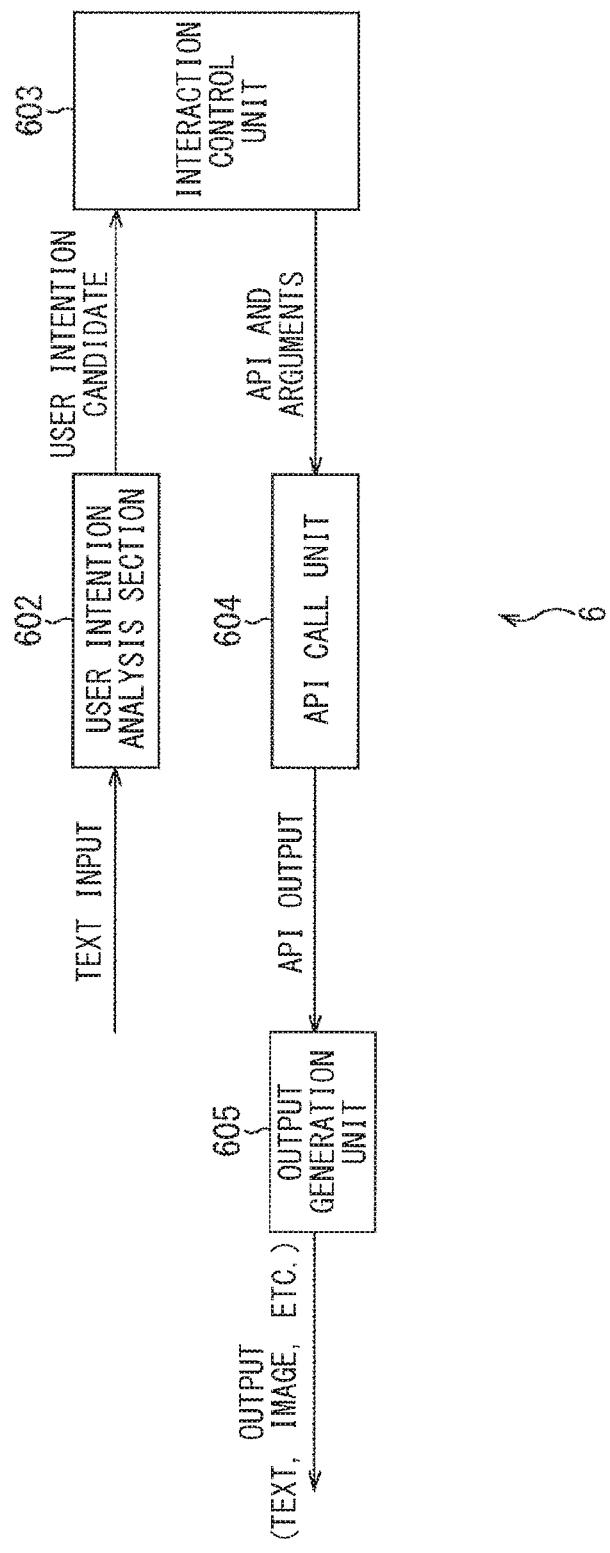
[FIG. 12]

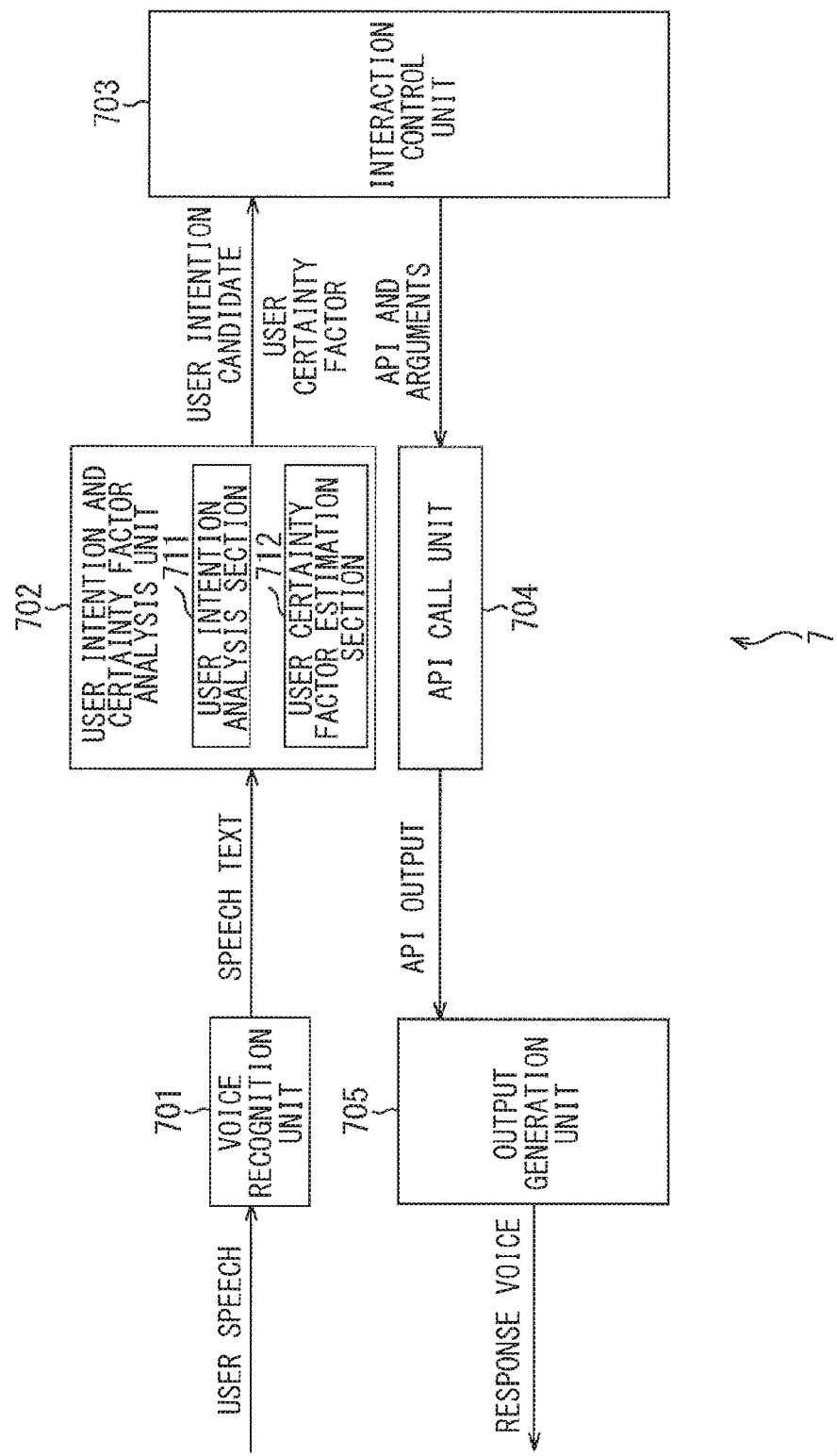
[FIG. 13]

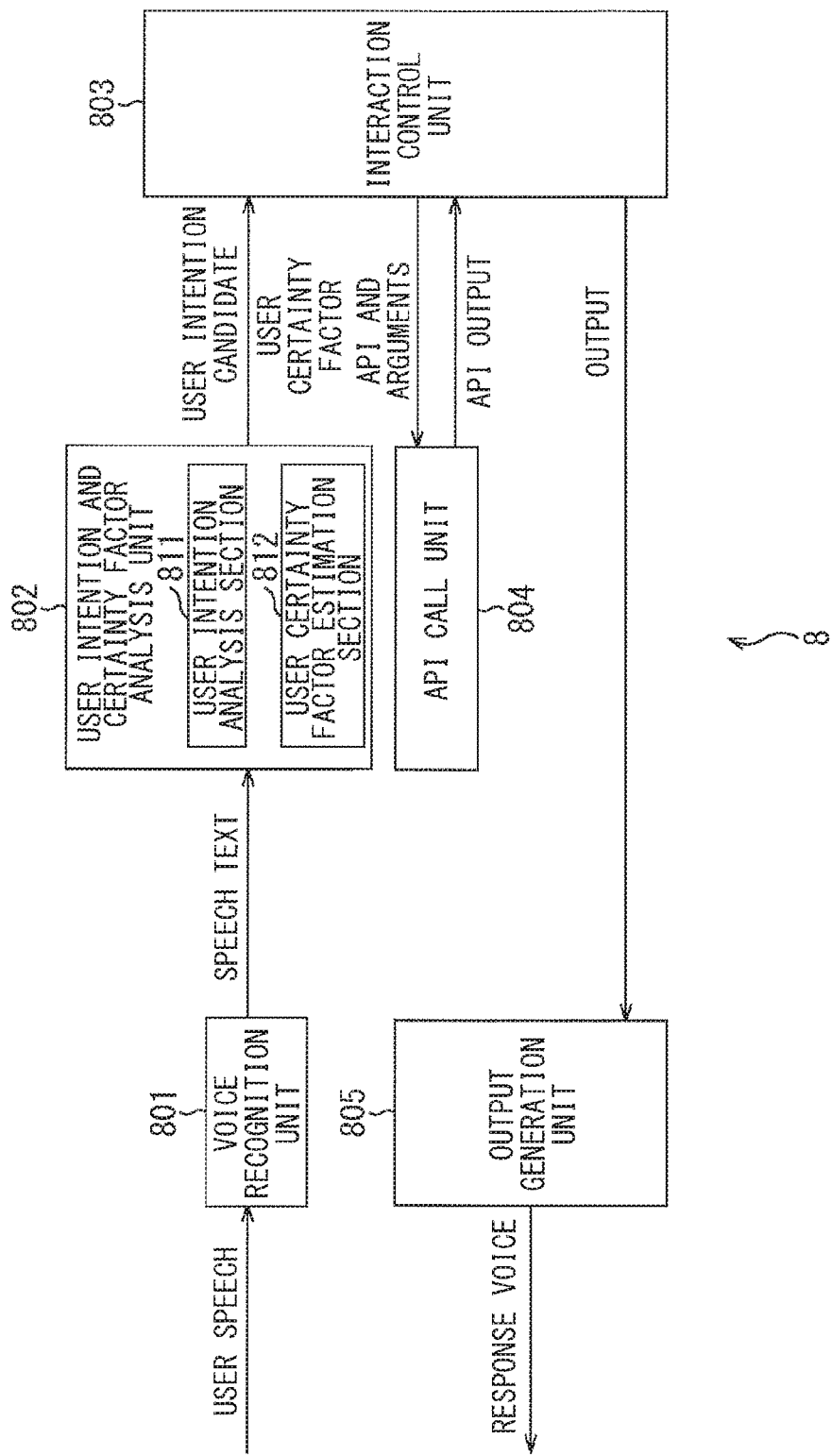
[FIG. 14]

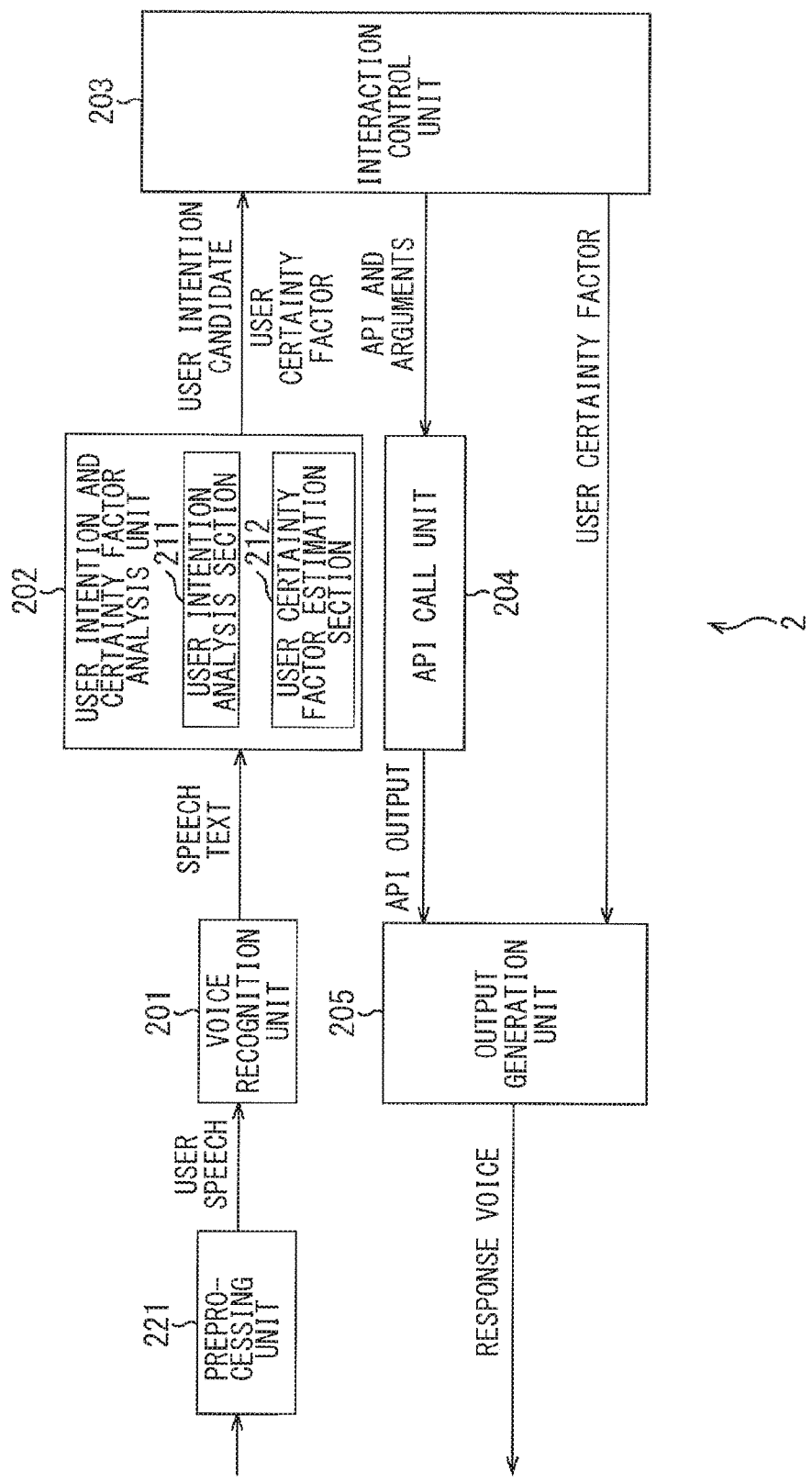
[FIG. 15]

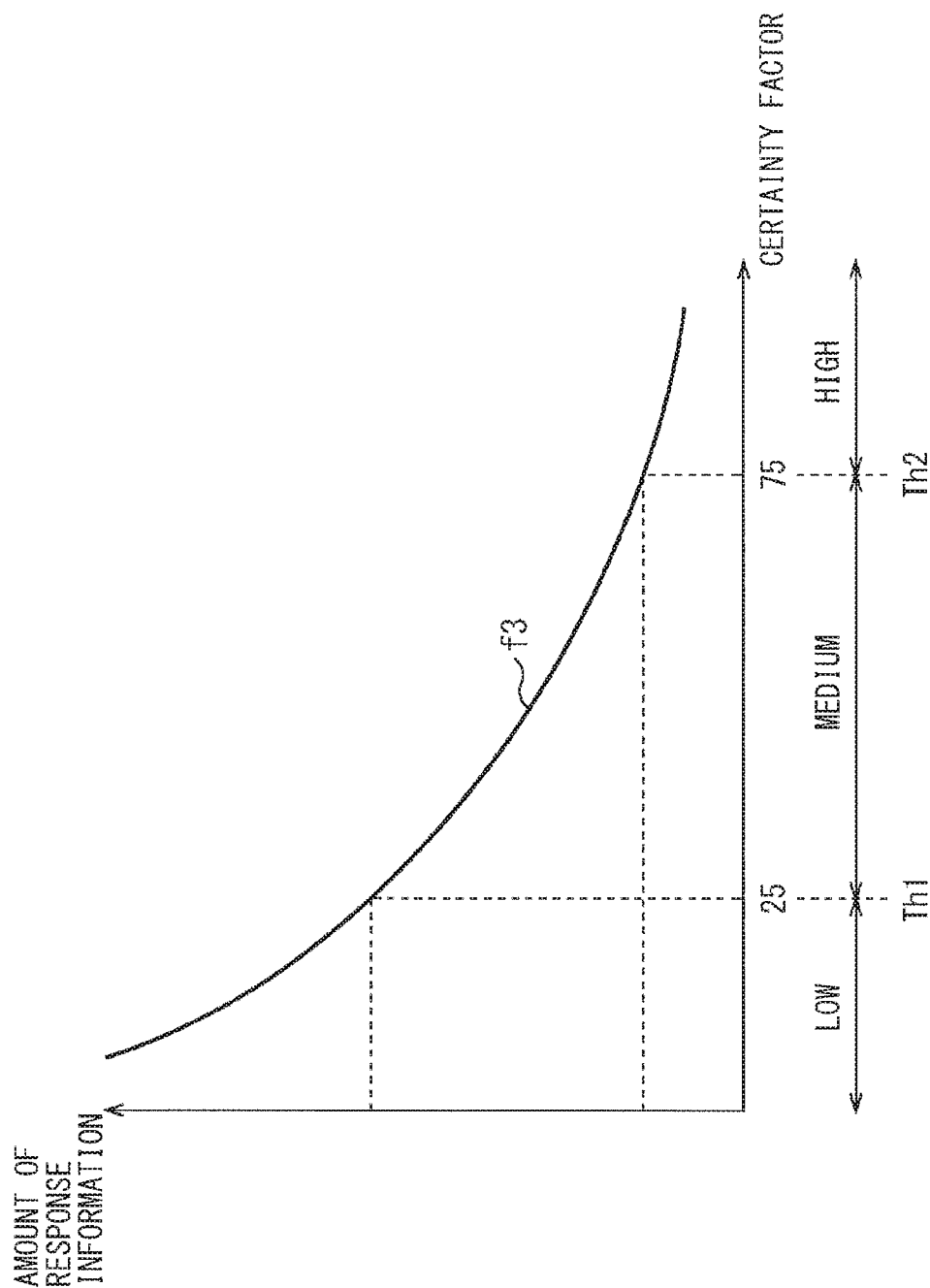
[FIG. 16]

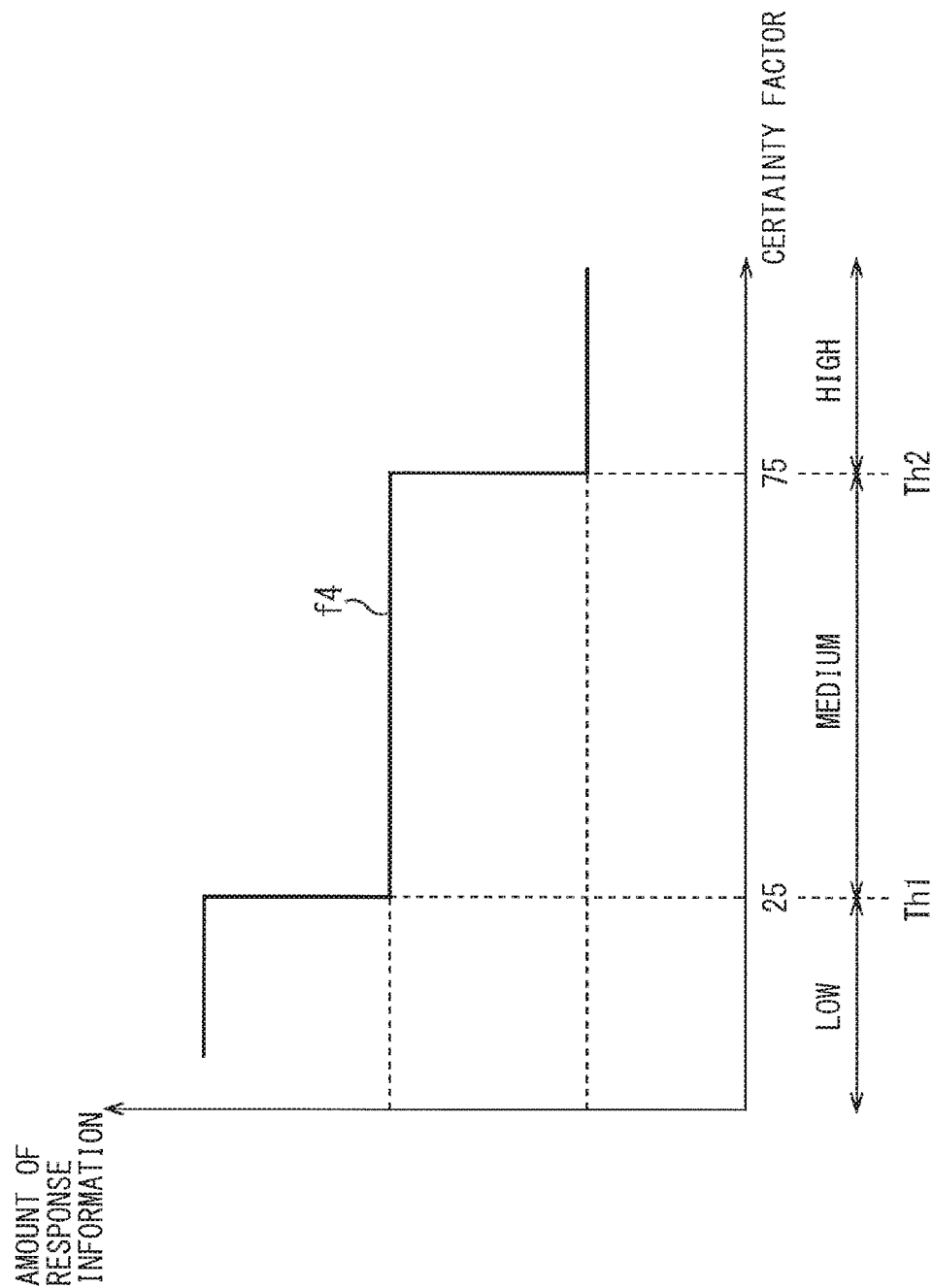
[FIG. 17]

[FIG. 18]
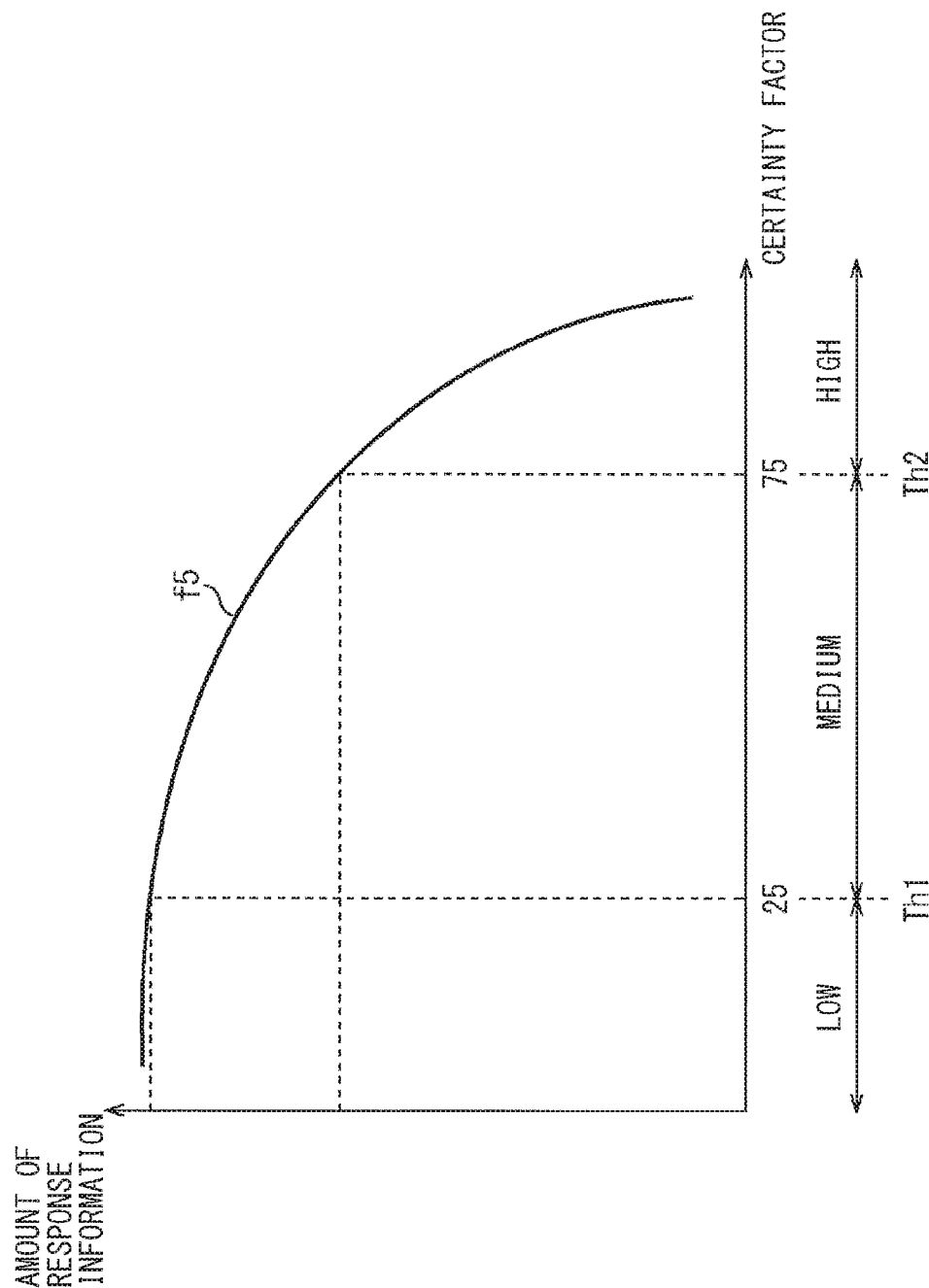

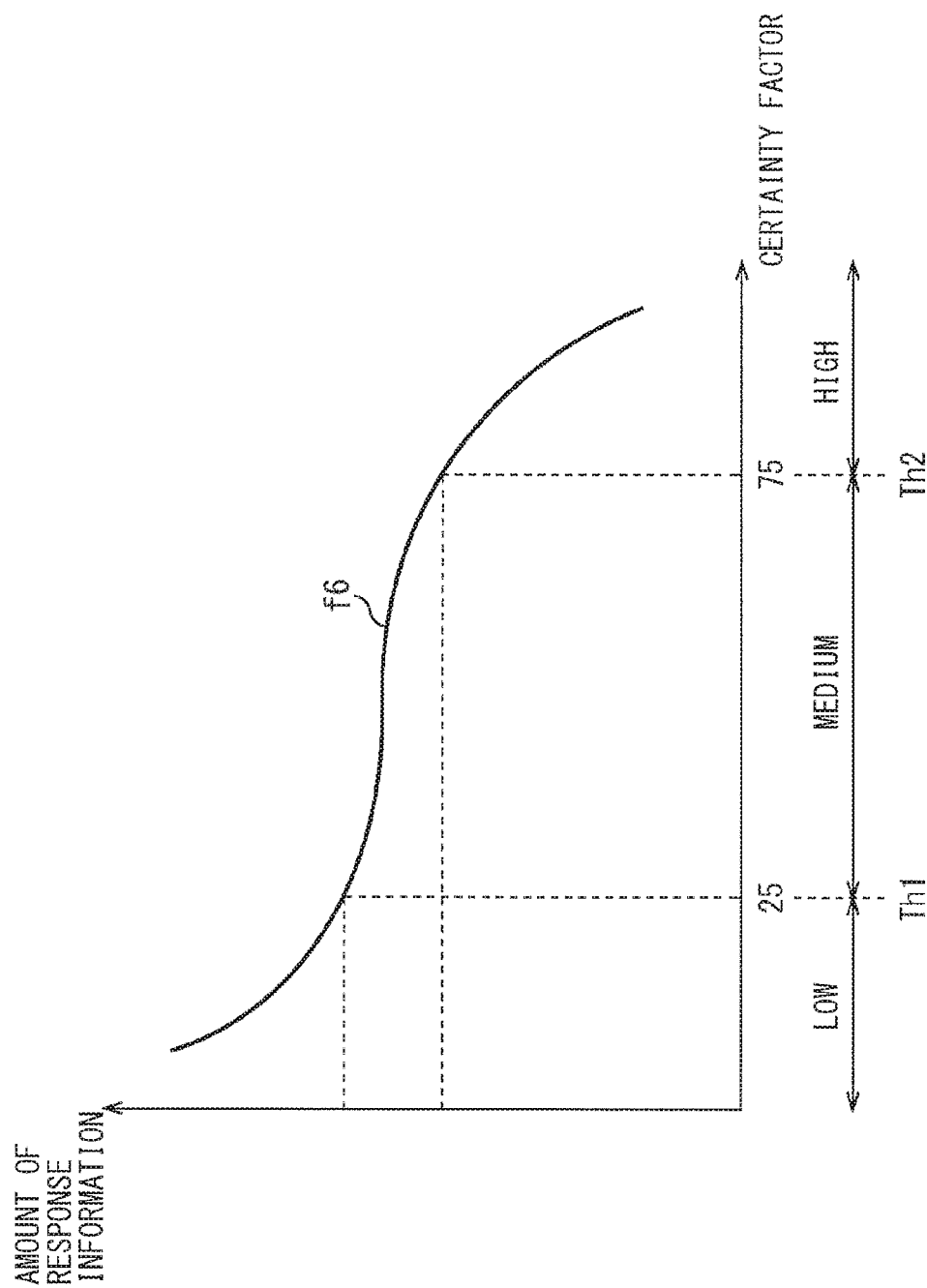
[FIG. 19]

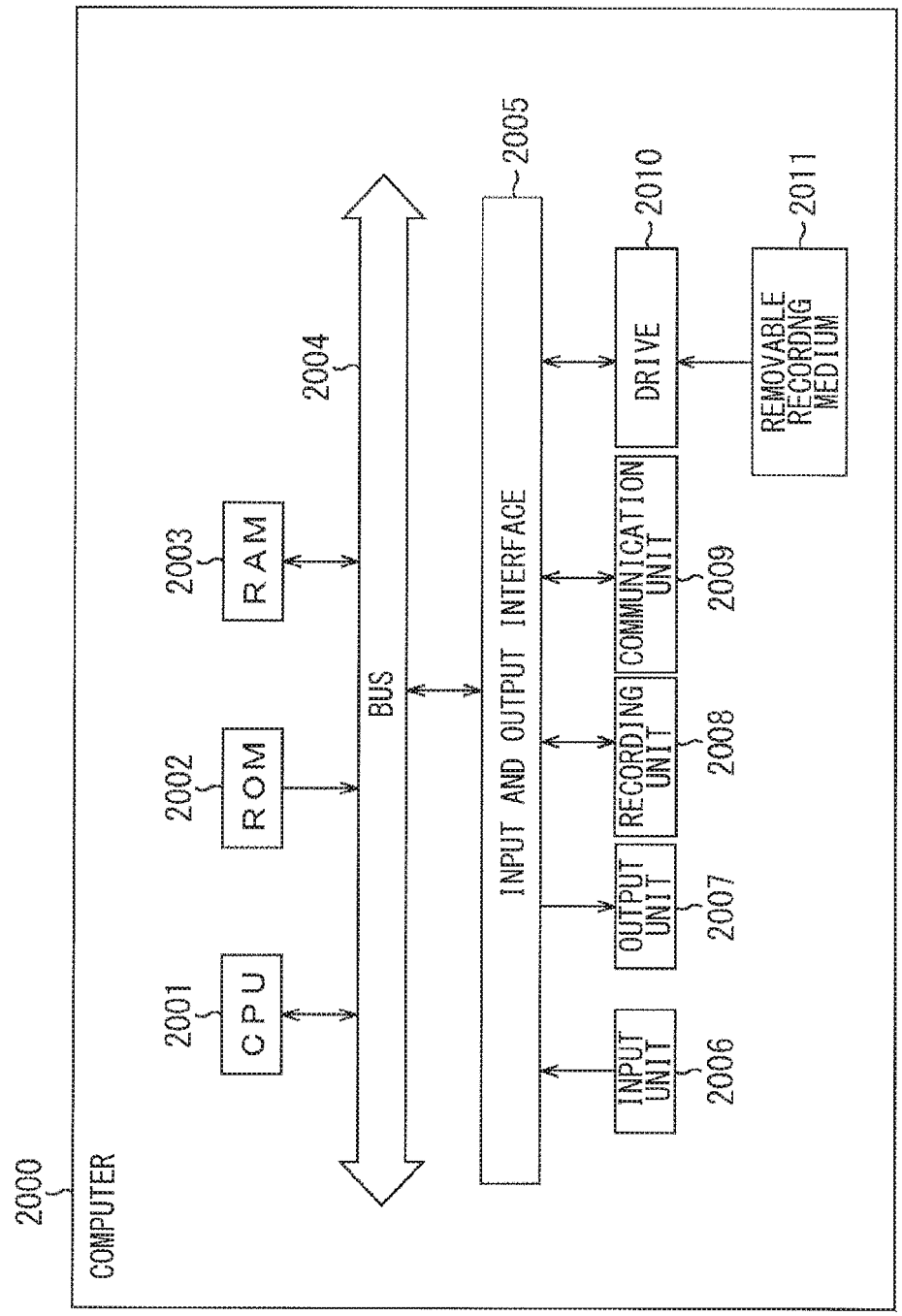
[FIG. 21]

INFORMATION PROCESSOR AND INFORMATION PROCESSING METHOD

CROSS REFERENCE TO RELATED APPLICATIONS

This application is a U.S. National Phase of International Patent Application No. PCT/JP2018/026824 filed on Jul. 18, 2018, which claims priority benefit of Japanese Patent Application No. JP 2017-149134 filed in the Japan Patent Office on Aug. 1, 2017. Each of the above-referenced applications is hereby incorporated herein by reference in its entirety.

TECHNICAL FIELD

The present technology relates to an information processor and an information processing method, and particularly, to an information processor and an information processing method that have enabled a voice interaction system to present, to a user, a response with an appropriate amount of information.

BACKGROUND ART

In a case where a user performs acquisition or confirmation of information through a voice interaction system, the voice interaction system often selects and executes an application API (Application Programming Interface) corresponding to user's speech intention, and presents, to the user, a result obtained thereby as a response text.

For example, as the voice interaction system, disclosed is a voice interaction system that switches responses in accordance with a certainty factor on side of the system (see PTL 1, for example).

CITATION LIST

Patent Literature

PTL 1: Japanese Unexamined Patent Application Publication No. 2011-54088

SUMMARY OF THE INVENTION

Problems to be Solved by the Invention

Incidentally, a general voice interaction system often performs generation of a response under the same rule for the same API calls. Consequently, the voice interaction system returns a response including the same amount of information at any given time, irrespective of how certain the user is about information that the user desires.

Accordingly, even in a case where the user only wishes to confirm whether or not information that the user knows is correct, the voice interaction system makes a response including all of information that the system knows, or the like. This may cause a contradiction between the amount of information that the user desires, and an amount of information outputted from the voice interaction system, thus resulting in a lack of smooth communications.

The present technology has been made in light of such circumstances and is to enable the voice interaction system to present to the user the response with the appropriate amount of information.

Means for Solving the Problems

An information processor of an aspect of the present technology is an information processor including a processing unit that adjusts an amount of information in a response with respect to desired information of a user, in accordance with a certainty factor of the user himself/herself that is estimated for the desired information.

The information processor of the aspect of the present technology may be an independent apparatus or an internal block that is included in a single apparatus.

An information processing method of an aspect of the present technology is an information processing method, of an information processor, including a step of adjusting, by the information processor, an amount of information in a response with respect to desired information of a user, in accordance with a certainty factor of the user himself/herself that is estimated for the desired information.

In the information processor and the information processing method of the respective aspects of the present technology, the amount of information in the response with respect to the user's desired information is adjusted in accordance with the user's own certainty factor that is estimated for the user's desired information.

Effect of the Invention

According to an aspect of the present technology, in a voice interaction system, it is possible to present, to a user, a response with an appropriate amount of information.

It is to be noted that the effects described here are not necessarily limiting, and any effect described in the present disclosure may be provided.

BRIEF DESCRIPTION OF DRAWINGS

FIG. 1 is a block diagram illustrating a configuration of a general voice interaction system.

FIG. 2 is a block diagram illustrating a configuration example of an embodiment of a voice interaction system to which the present technology is applied.

FIG. 3 is a block diagram illustrating a configuration example of a voice interaction system.

FIG. 4 is a block diagram illustrating a configuration example of a voice processing apparatus.

FIG. 5 is a block diagram illustrating a configuration example of a server.

FIG. 6 is a diagram illustrating an example of a schedule DB.

FIG. 7 is a diagram illustrating an example of a relationship of a user's certainty factor and an amount of information of a system response.

FIG. 8 is a block diagram illustrating another configuration example of the voice interaction system to which the present technology is applied.

FIG. 9 is diagram illustrating an example of the schedule DB.

FIG. 10 is a diagram illustrating an example of a relationship of the user's certainty factor and the amount of information in the system response.

FIG. 11 is a block diagram illustrating another configuration example of the voice interaction system to which the present technology is applied.

FIG. 12 is a block diagram illustrating a configuration of a general text chat system.

FIG. 13 is a block diagram illustrating a first modification example of a configuration of the voice interaction system to which the present technology is applied.

FIG. 14 is a block diagram illustrating a second modification example of the configuration of the voice interaction system to which the present technology is applied.

FIG. 15 is a block diagram illustrating a third modification example of the configuration of the voice interaction system to which the present technology is applied.

FIG. 16 is a diagram illustrating a first modification example of the relationship of the user's certainty factor and the amount of information in the system response.

FIG. 17 is a diagram illustrating a second modification example of the relationship of the user's certainty factor and the amount of information in the system response.

FIG. 18 is a diagram illustrating a third modification example of the relationship of the user's certainty factor and the amount of information in the system response.

FIG. 19 is a diagram illustrating a fourth modification example of the relationship of the user's certainty factor and the amount of information in the system response.

FIG. 21 is a diagram illustrating a configuration example of a computer.

MODES FOR CARRYING OUT THE INVENTION

Figure 20:
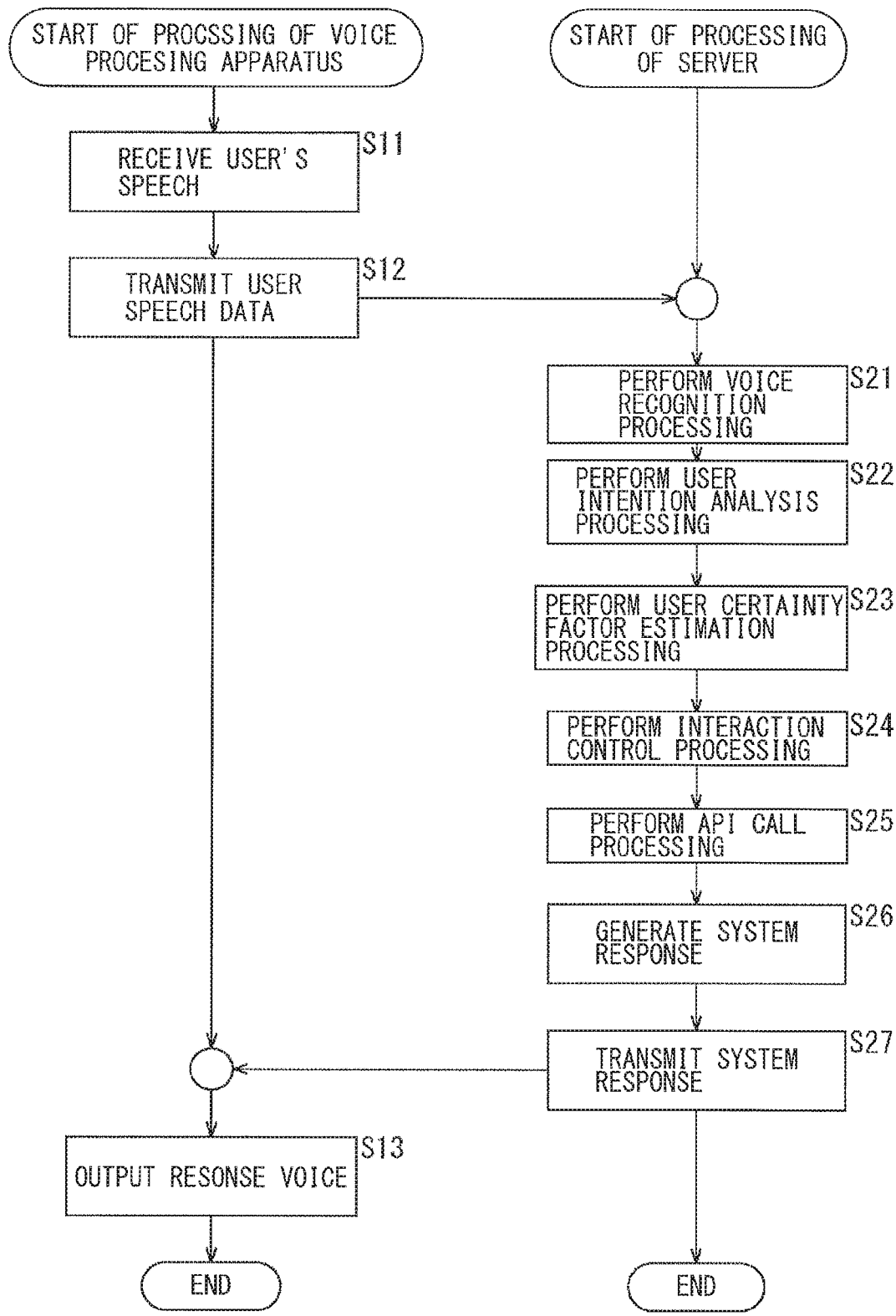
FIG. 20 is a flowchart describing voice interaction processing.

In the following, embodiments of the present technology are described with reference to the drawings. It is to be noted that description is given in the following order.
1. System Configuration
2. Embodiments of Present Technology
(1) First Embodiment: Basic Form
  (1-1) A case where a user's certainty factor is high
  (1-2) A case where the user's certainty factor is medium.
  (1-3) A case where the user's certainty factor is low
  (1-4) A case where, although the user's certainty factor seems high, it is incorrect as a fact
  (1-5) When there is a plurality of choices in a case where it is incorrect as the fact
(2) Second Embodiment: A case where a target person of a schedule is different from a talker
  (2-1) A case where the user's own certainty factor about another person's schedule is high
  (2-2) A case where the user's own certainty factor about the other person's schedule is medium
  (2-3) A case where the user's own certainty factor about the other person's schedule is low
(3) Third Embodiment: A case where sensor information is utilized
3. Modification Examples
4. Flow of Voice Interaction Processing
5. Computer Configuration

1. SYSTEM CONFIGURATION (Configuration of General Voice Interaction System)

FIG. 1 is a block diagram illustrating a configuration of a general voice interaction system.

In FIG. 1, a general voice interaction system 1 includes a voice recognition unit 101, a user intention analysis unit 102, an interaction control unit 103, an API call unit 104, and an output generation unit 105.

The voice recognition unit 101 converts user speech data inputted to the voice recognition unit 101 into speech text data, and supplies the speech text data to the user intention analysis unit 102.

The user intention analysis unit 102 processes the text data supplied from the voice recognition unit 101 to analyze a user's intention, and supplies, to the interaction control unit 103, data indicating a candidate of the user's intention (hereinafter referred to as user intention candidate data) obtained as a result of the analysis.

On the basis of the user intention candidate data supplied from the user intention analysis unit 102 or the like, the interaction control unit 103 estimates a current interaction state and determines an API to be called and an argument thereof. The interaction control unit 103 supplies, to the API call unit 104, data indicating the API to be called and the argument of the API (hereinafter referred to as API and argument data).

The API call unit 104 passes the argument to the API to be called and executes the API on the basis of the API and argument data supplied from the interaction control unit 103. The API call unit 104 supplies, to the output generation unit 105, a result obtained by executing the API as API output.

The output generation unit 105 generates a response text to the user (hereinafter referred to as a system response) on the basis of the API output supplied from the API call unit 104 and outputs response voice corresponding to voice data thereof.

The general voice interaction system 1 is configured as described above.

Here, the general voice interaction system 1 (FIG. 1) performs the same API call and performs the response generation using a result of the API call by the same method, irrespective of how much the user is certain about (certainty factor) a content of a schedule that the user wishes to confirm. Consequently, a response including the same amount of information is obtained at any given time.

Accordingly, the same response is obtained both in a case where the user wishes to perform simple confirmation and a case where the user wishes to confirm details of the schedule.

Therefore, even in a case where the user wishes to perform the simple confirmation, the response with the large amount of information is obtained, which may possibly slow down a pace of interaction and result in a lack of smooth communications. Similarly, even in a case where the user desires the large amount of information, the voice interaction system may not return detailed information depending on implementation of the voice interaction system. This makes additional interaction necessary to seek more information and may possibly result in the lack of smooth communications.

Hence, in a voice interaction system to which the present technology is applied, by estimating a user's own certainty factor about information that the user desires (desired information) and controlling an amount of information to be included in the response generation in accordance with a result of the estimation, it is possible to present, to the user, the response with an appropriate amount of information, thus allowing for realization of smoother communications. In the following, description is given of a configuration of the voice interaction system to which the present technology is applied.

(Configuration of Voice Interaction System of Present Technology)

FIG. 2 is a block diagram illustrating a configuration example of an embodiment of the voice interaction system to which the present technology is applied.

In FIG. 2, a voice interaction system 2 includes a voice recognition unit 201, a user intention and certainty factor analysis unit 202, an interaction control unit 203, an API call unit 204, and an output generation unit 205.

By referring to a voice-to-text conversion database, the voice recognition unit 201 converts user speech data inputted thereto into speech text data. The voice recognition unit 201 supplies the speech text data corresponding to the user speech to the user intention and certainty factor analysis unit 202.

Here, the user speech data is transmitted from a voice processing apparatus that acquires voice outputted from the user (for example, a voice processing apparatus 10 in FIG. 3 to be described later). In addition, a huge voice recognition database is accumulated in the voice-to-text conversion database. Through the use of a predetermined recognition algorithm, the voice recognition unit 201 is able to convert the user speech data (voice data) inputted thereto into the speech text data (text data).

The user intention and certainty factor analysis unit 202 performs analysis processing on the speech text data supplied from the voice recognition unit 201. The user intention and certainty factor analysis unit 202 includes a user intention analysis section 211 and a user certainty factor estimation section 212.

The user intention analysis section 211 analyzes the user's intention by performing the analysis processing on the speech text data supplied from the voice recognition unit 201. The user intention analysis section 211 supplies the user intention candidate data obtained as a result of the analysis to the interaction control unit 203.

The user certainty factor estimation section 212 estimates the user's certainty factor by performing the analysis processing on the speech text data supplied from the voice recognition unit 201. The user certainty factor estimation section 212 supplies, to the interaction control unit 203, data indicating the user's certainty factor (hereinafter referred to as user certainty factor data) obtained as a result of the estimation.

On the basis of the user intention candidate data supplied from the user intention and certainty factor analysis unit 202, an interaction history database, and the like, the interaction control unit 203 estimates the current interaction state and determines the API to be called and the argument of the API. It is to be noted that the interaction history database accumulates information regarding the interaction history of the past or the like.

The interaction control unit 203 supplies the determined API and argument data to the API call unit 204. In addition, the interaction control unit 203 supplies the user certainty factor data to the output generation unit 205.

The API call unit 204 passes, to the API to be called, the argument of the API and executes the API on the basis of the API and argument data supplied from the interaction control unit 203. The API call unit 204 supplies, to the output generation unit 205, a result obtained by execution of the API, as the API output.

Here, the API to be called is an API corresponding to the user's intention. For example, in a case where the user's intention relates to checking of a schedule, an API for performing a schedule check (hereinafter also referred to as a schedule API) is called and executed.

To the output generation unit 205, inputted are the user certainty factor data from the interaction control unit 203 and the API output data from the API call unit 204.

On the basis of the user certainty factor data and the API output data, the output generation unit 205 generates the response text (system response) to the user and outputs the response voice corresponding to the voice data of the response text. Here, however, when the system response is generated, an amount of information to be included in the response text is controlled (adjusted) in accordance with the user's certainty factor.

For example, in a case where a value representative of the user's certainty factor exceeds a predetermined threshold, it is determined that the user's certainty factor is high, and a more compact system response is generated. This makes it possible to present only the information that the user desires. In contrast, for example, in a case where the value representative of the user's certainty factor is equal to or lower than the predetermined threshold, it is determined that the user's certainty factor is low and the system response including more detailed information is generated. This makes it possible to appropriately present, to the user, the information that the user desires in one interaction.

The voice interaction system 2 is configured as described above.

Incidentally, a voice interaction service provided by the voice interaction system 2 includes a service that combines voice recognition processing, natural language processing, and the like to appropriately respond or act to an inquiry or a request made by means of a spoken language, for example.

To implement such a voice interaction service, it is possible to configure the voice interaction system 2 as illustrated in FIG. 3, for example. That is, it is possible to cause the voice interaction system 2 to include the voice processing apparatus 10 which is installed on side of a client and serves as a user interface of the voice interaction service, and a server 20 which is installed on side of the server such as a data center or the like and performs processing for implementing a voice interaction function.

In the voice interaction system 2, the voice processing apparatus 10 and the server 20 are coupled to each other via the Internet 30.

The voice processing apparatus 10 is, for example, a speaker that is couplable to a network such as a home LAN (Local Area Network), etc., and is also referred to as a so-called smart speaker, or the like. This type of speaker allows for voice-driven operations on a device such as a lighting fixture, an air-conditioner, or the like, in addition to music playback.

It is to be noted that the voice processing apparatus 10 is not limited to the speaker, and may also be configured as a mobile device such as a smart phone or a mobile phone, a tablet-type computer, or the like.

The voice processing apparatus 10 is able to provide the user with the (user interface of the) voice interaction service by linking with the server 20 via the Internet 30.

That is, the voice processing apparatus 10 acquires voice generated from the user (user speech) and transmits the voice data thereof to the server 20 via the Internet 30. In addition, the voice processing apparatus 10 receives processed data transmitted from the server 20 via the Internet and outputs the voice corresponding to the processed data.

The server 20 is a server that provides a cloud-based voice interaction service. The server 20 performs the voice recognition processing for converting, into the text data, the voice data transmitted from the voice processing apparatus 10 via the Internet 30. In addition, the server 20 performs, on the text data, processing such as interaction processing corresponding to the user's intention, and transmits the processed data obtained as a result of the processing to the voice processing apparatus 10 via the Internet 30.

(Configuration of Voice Processing Apparatus)

FIG. 4 is a block diagram illustrating a configuration example of the voice processing apparatus 10 of FIG. 3.

In FIG. 4, the voice processing apparatus 10 includes a processing unit 51, a microphone 52, a speaker 53, a sensor 54, and a communication I/F 55.

The processing unit 51 includes, for example, a CPU (Central Processing Unit), a microprocessor, or the like. The processing unit 51 operates as a central processor in the voice processing apparatus 10, by performing various types of arithmetic processing, operation control of respective units, or the like.

The microphone 52 is a device (sound pickup device) that converts sound from outside into an electric signal. The microphone 52 supplies a voice signal obtained by the conversion to the processing unit 51.

The speaker 53 is a device that converts the electric signal into physical vibrations to generate a sound. The speaker 53 outputs a sound corresponding to the voice signal supplied from the processing unit 51.

The sensor 54 includes various types of sensors. The sensor 54 performs sensing and supplies, to the processing unit 51, sensor information (sensor data) corresponding to a result of the sensing.

For example, as the sensor 54, it is possible to include various sensors such as an image sensor that performs imaging an object, a magnetic sensor that detects size or a direction of a magnetic field (magnetizing field), an acceleration sensor that detects acceleration, a gyro sensor that detects an angle (profile), an angular speed, or angular acceleration, a proximity sensor that detects an adjacent object, or a biosensor that detects biological information such as a fingerprint, an iris, pulses, etc.

Further, it is also possible that the sensor 54 include sensors for measuring a surrounding environment, such as a temperature sensor that detects a temperature, a humidity sensor that detects humidity, an environment light sensor that detects brightness of surroundings, or the like. It is to be noted that the sensor data may include information such as positional information (positional data) calculated from a GPS (Global Positioning System) signal, etc., time information clocked by a clocking means, or the like.

The communication I/F 55 includes, for example, a communication interface circuit or the like. The communication I/F 55 follows control from the processing unit 51 to gain access to the server 20 coupled to the Internet 30 and exchange various types of data.

Here, of functions provided by units from the voice recognition unit 201 to the output generation unit 205 that configure the voice interaction system 2 (FIG. 2), for example, the processing unit 51 has a function to input the user speech data to the voice recognition unit 201 and a function to output the response voice corresponding to (the voice data of) the system response.

That is, the processing unit 51 processes the voice signal supplied from the microphone 52, and supplies the voice data obtained as a result of the processing to the communication I/F 55. With this, the user speech data (voice data) is transmitted to the server 20 via the Internet 30 and inputted to the voice recognition unit 201. In addition, the processing unit 51 is able to supply the sensor data to the communication I/F 55 to transmit the sensor data to the server 20 via the Internet 30.

In addition, the processing unit 51 processes the voice data supplied from the communication I/F 55 and supplies the voice signal obtained as a result of the processing to the speaker 53. With this, the response voice corresponding to (the voice data of) the system response is outputted from the speaker 53.

It is to be noted that a display unit for displaying various types of information (for example, characters, images, etc.), an input unit that receives an operation from the user, a storage unit that holds the various types of data (for example, the voice data, the text data, etc.), or the like may be further provided in the voice processing apparatus 10, although those units are not illustrated in FIG. 4.

Here, the display unit includes a liquid crystal display, an organic EL display, or the like, for example. The input unit includes a button, a keyboard, or the like, for example. Further, the input unit may be configured as a touch panel in which a touch sensor and the display unit are integrated, and may make it possible to obtain an operation signal corresponding the operation through a user's finger or a touch pen (stylus pen). The storage unit includes a flash memory (Flash Memory), which is a type of a nonvolatile memory, a DRAM (Dynamic Random Access Memory), which is a type of a volatile memory, or the like.

(Configuration of Server)

FIG. 5 is a block diagram illustrating a configuration example of the server 20 of FIG. 3.

In FIG. 5, the server 20 includes a processing unit 71, a communication I/F 72, and a database 73.

The processing unit 71 includes a CPU, a microprocessor, or the like, for example. The processing unit 71 operates as a central processor in the server 20, by performing various types of arithmetic processing or control of operations of the respective units.

The communication I/F 72 includes a communication interface circuit or the like, for example. Following the control from the processing unit 71, the communication I/F 72 exchanges various types of data with the voice processing apparatus 10 coupled via the Internet 30.

The database 73 is configured as a mass storage apparatus such as a hard disk (HDD: Hard Disk Drive), a semiconductor memory, an optical disk, or the like, for example.

For example, the database 73 includes a voice recognition database for performing the voice recognition processing, the interaction history database for performing the interaction processing, or the like. It is to be noted that the voice recognition database or the interaction history database is an example of a database, and it is possible to include a database (for example, a knowledge database, a speech database, or the like) that is necessary for implementing the voice interaction service.

Here, of the functions provided by the units from the voice recognition unit 201 to the output generation unit 205 that configure the voice interaction system 2 (FIG. 1), for example, the processing unit 71 has some of the functions of the voice recognition unit 201, the user intention and certainty factor analysis unit 202, the interaction control unit 203, the API call unit 204, and the output generation unit 205.

That is, referring to the voice recognition database included in the database 73, the processing unit 71 performs the voice recognition processing for converting the user speech data (voice data), which is transmitted from the voice processing apparatus 10 via the Internet 30, into the speech text (text data).

In addition, using the speech text obtained in the voice recognition processing, the processing unit 71 performs processing of estimating the user's own certainty factor of the information that the user desires, when performing the interaction processing corresponding to the user's intention, and of controlling (adjusting) the amount of information included in the response generation in accordance with the result of the processing. With this, the system response including the appropriate amount of information is generated as the response text to the user and is transmitted as the processed data to the voice processing apparatus 10 via the Internet 30.

It is to be noted that, for convenience of description, although a case is illustrated where one voice processing apparatus 10 is provided in the voice interaction system 2 of FIG. 3, it is possible to provide a plurality of voice processing apparatuses 10 for respective users, for example.

In addition, although a case is illustrated where one server 20 is provided in the voice interaction system 2 of FIG. 3, it is possible to provide a plurality of servers 20 for respective functions (modules), for example. More specifically, it is possible to provide, as the individual servers 20, the server 20 having a voice recognition module associated with the voice recognition unit 201, the server 20 having an interaction control module associated with the interaction control unit 203, or the like.

2. EMBODIMENT OF PRESENT TECHNOLOGY

(1) First Embodiment

In the following, description is given of a specific example of the voice interaction service provided by the voice interaction system 2. Here, the voice interaction for performing the schedule check is set forth as an example. An assumption of the example is that the user has already registered a schedule illustrated in FIG. 6.

In FIG. 6, two schedules are registered as a schedule specified by a title, a date and time, a location, and a target person. That is, in a first record, a meeting in Main Conference Room at 10 AM on Mar. 23, 2017 is registered as the schedule of Father (Dad). In addition, in a second record, a schedule of shopping at Shibuya at 5 PM on Mar. 23, 2017 is registered as Dad's schedule.

It is to be noted that information regarding these schedules has been registered in the database 73 (FIG. 5) of the server 20, as information stored in a schedule database (hereinafter referred to as a schedule DB).

It is assumed here that the user has spoken to the voice interaction system 2 on Mar. 22, 2017. Therefore, the schedules illustrated in FIG. 6 are registered as tomorrow's schedules for the user and the voice interaction system 2.

It is also assumed that, in the voice interaction system 2, the API (Application Programming Interface) for performing the schedule check has, for example, four arguments as listed below.

Schedule API (pram1, pram2, pram3, pram4)
First argument: Title
Second argument: Date and Time
Third argument: Location
Fourth argument: Target person In the following specific example, the user performs the interaction with the voice interaction system 2 having such a schedule DB and a schedule API, with an intention to perform checking of the schedule that has already been registered. In the following specific example, however, for comparison, description is also given of the general voice interaction system 1 (FIG. 1), as appropriate.

(1-1) A Case Where User's Certainty Factor is High

Here, a case is assumed where, although the user is aware that there is the meeting at 10 AM tomorrow as his own schedule, the user simply wishes to check whether or not the schedule is correct. In this case, it is assumed that the user has said, for example, "I have a meeting schedule at 10 AM tomorrow, don't I?"

At this time, in the general voice interaction system 1 (FIG. 1), it is estimated that the user's intention is the "schedule check", and the arguments thereof are "Title="Meeting"" and "Date and Time="Mar. 23, 2017 10 AM"". The arguments are passed to the schedule API that performs the schedule check.

In a case where this schedule API is executed, as the API output, it is obtained that one record including "Title="Meeting"", "Date and Time="Mar. 23, 2017 10 AM"", and "Location="Main Conference Room"" is present in schedules registered in the schedule DB.

Then, as the system response, for example, "There is the meeting schedule from 10 AM tomorrow. The location is Main Conference Room," is obtained.

However, at this time, the user himself is aware that the user has the meeting schedule at 10 AM tomorrow and just wishes to check whether or not that information is correct. Nevertheless, the system response obtained here parrots the information that the user has already known, and is occupied by much information that is unnecessary for the user.

Consequently, although it is sufficient to have communication with a compact response in the first place, the user has to listen to the response having the large amount of information. This results in a loss of the pace of interaction, that is, smoothness of the communications.

In contrast, in the voice interaction system 2 (FIG. 2) to which the present technology is applied, it is estimated how certain (certainty factor) the user himself is of the information that the user desires (desired information) on the basis of the information obtained from the user's speech, and the amount of information in the response is controlled (adjusted).

In the aforementioned example, because the speech "I have a meeting schedule at 10 AM tomorrow, don't I?" clearly indicates "Title="Meeting"" and "Date and Time="Mar. 23, 2017 10 AM"" and no word representing ambiguity such as "Perhaps" or "I suppose", etc. is included for that information, it is possible to estimate that the certainty factors of the title and the date and time of that schedule are high.

Therefore, it is possible to provide only the information that the user desires, by omitting the information that the user has already known (information with the high certainty factor) and making the system response compact such as "Yes", for example, which allows for continuation of the interaction at a good pace.

It is to be noted that, in the aforementioned example, although the speech includes no content indicating the location, the location information may not be included in the system response because the certainty factors about the title and the date and time are high, and the schedule is the user's own schedule, and it is possible to estimate that the user has already known the location.

In such a case where the user's certainty factor is high, the contents of the processing performed by the voice interaction system 2 of FIG. 2 are as follows, for example.

That is, sound of the user speech data being "I have a meeting schedule at 10 AM tomorrow, don't I?" is acquired by the voice processing apparatus 10 (FIG. 3), and inputted to the voice recognition unit 201. The voice recognition unit 201 performs the voice recognition processing and converts the user speech data into the speech text data.

The user intention analysis section 211 performs the analysis processing on the speech text data thus obtained, and a candidate of the user's intention is thereby obtained. In addition, the user certainty factor estimation section 212 performs the analysis processing on the speech text data, and the user's certainty factor is thereby obtained. It is estimated here that the certainty factor of the schedule title or the date and time is high because the schedule title or the data and time is accurately indicated and no word representing ambiguity of the information is included.

The interaction control unit 203 estimates the current interaction state on the basis of the user intention candidate data, the interaction history database, or the like, and determines the API to be called and the argument of the API. Here, determined are the schedule API that performs the schedule check in accordance with the user speech data, as well as "Title="Meeting"" and "Date and Time="Mar. 23, 2017 10 AM"" as the arguments of the schedule API. Thus, the API call unit 204 passes, to the schedule API to be called, the arguments (title, and date and time) thereof and executes the API.

Although, in the output generation unit 205, as the API output, it is obtained that one relevant record is present in the schedules registered in the schedule DB, a more compact system response is generated because it is estimated that the certainty factor of the schedule title or the date and time is high as the user's certainty factor.

Here, there is a relationship as illustrated in FIG. 7, for example, between the user's certainty factor and the amount of information in the system response. In FIG. 7, a function f1 represents a relationship between the user's certainty factor and the amount of information in the response, where a horizontal axis represents the user's certainty factor and a vertical axis represents the amount of information in the system response (amount of response information).

In FIG. 7, the function f1 has a negative proportional relationship in which the higher the user's certainty factor is, the smaller the amount of the response information is, while the lower the user's certainty factor is, the larger the amount of response information is. It is assumed here that, for example, thresholds (Th1 and Th2) are set so that a score equal to or higher than 75 represents the high certainty factor, a score less than 25 represents the low certainty factor, and a score equal to or higher than 25 and less than 75 represents the medium certainty factor.

At this time, for example, in a case where the score of the certainty factor being 85 is calculated, it is estimated that the certainty factor of the schedule title or the date and time is high, and as the compact system response, the response such as "Yes" with the information having the high certainty factor omitted is outputted.

(1-2) A Case Where the User's Certainty Factor is Medium

It is assumed here that, although the user knows that the user has some schedule tomorrow, the user is not sure about the date and time. In this case, it is assumed that the user has said, "I suppose that it is tomorrow. Is the meeting scheduled?", for example.

At this time, in the general voice interaction system 1 (FIG. 1), it is estimated that the user's intention is the "schedule check" and its arguments are "Title="Meeting"" and "Date and Time="Mar. 23, 2017"", and the arguments are passed to the schedule API.

In a case where this schedule API is executed, as the API output, it is obtained that one record including "Title="Meeting"", "Date and Time="Mar. 23, 2017 10 AM"", and "Location="Main Conference Room"" is present in the schedules registered in the schedule DB.

Then, as the system response, "There is one meeting schedule from 10 AM tomorrow. The location is the Main Conference Room" is obtained, for example. It is to be noted that, in the general voice interaction system 1 (FIG. 1), this system response has the content similar to the content of the response to the speech being "I have a meeting schedule at 10 AM tomorrow, don't I?" in another example described earlier.

At this time, however, the user himself/herself only has to be able to confirm whether or not the meeting is scheduled tomorrow, and does not seek all detailed information. Therefore, in the system response obtained in the general voice interaction system 1 (FIG. 1), the response is overloaded with information, which slows down the pace of the communications.

In contrast, in the voice interaction system 2 (FIG. 2) to which the present technology is applied, it is possible to estimate from the user speech data being "I suppose that it is tomorrow" that the certainty factor of the date and time is medium because the date and time is "tomorrow" but the time information is not included or because the date and time is modified by wording "I suppose". In addition, as for the title, the user clearly has said, "the meeting", thus making it possible to estimate that the certainty factor is high.

Thus, it is possible to generate a simple system response such as "Yes. The meeting is at 10 AM tomorrow," by omitting the title with the high certainty factor, and including more details about the date and time with the medium certainty factor.

In such a case where the user's certainty factor is medium, the contents of the processing performed by the voice interaction system 2 of FIG. 2 are as follows, for example.

That is, the user certainty factor estimation section 212 performs the analysis processing on the speech text data being "I suppose that it is tomorrow. Is the meeting scheduled?" and the user's certainty factor is thereby obtained. It is estimated here that the certainty factor is medium because no time information regarding the scheduled date and time is included or the speech is modified by the words representing ambiguity. In addition, it is estimated that the certainty factor of the schedule title is high, because the schedule title is accurately indicated.

Then, in the output generation unit 205, as the API output, it is obtained that one relevant record is present in the schedules registered in the schedule DB. However, as the user's certainty factor, although the certainty factor of the schedule title is high, it is estimated that the certainty factor of the scheduled date and time is medium. Thus, the simple system response including detailed information is generated regarding the date and time having the medium certainty factor.

Here, in a case where there is the relationship, such as the function f1 illustrated in FIG. 7, for example, between the user's certainty factor and the amount of information in the system response, it is estimated that the certainty factor of the scheduled date and time is medium when the score of the certainty factor being 70, for example, is calculated. Then, as the simple system response, the response such as "Yes. The meeting is at 10 AM tomorrow," that includes the detailed information regarding the scheduled date and time with the medium certainty factor is outputted.

(1-3) A Case Where the User's Certainty Factor is Low

It is assumed here that the user does not know whether or not the user has the schedule tomorrow. In this case, it is assumed that the user has said, "What schedule do I have tomorrow?", for example.

At this time, in the general voice interaction system 1 (FIG. 1), the user's intention is the "schedule check", and it is estimated that the argument thereof is "Date and Time="Mar. 23, 2017"", and the argument is passed to the schedule API.

In a case where this schedule API is executed, as the API output, it is obtained that two records, the record including "Title="Meeting"", "Date and Time="Mar. 23, 2017 10 AM"", and "Location="Main Conference Room"" and the record including "Title="Shopping"", "Date and Time="Mar. 23, 2017 5 PM"", and "Location="Shibuya"" are present in the schedules registered in the schedule DB.

Then, as the system response, "Tomorrow there are the meeting schedule at Main Conference Room at 10 AM and the shopping schedule in Shibuya at 5 PM," is obtained, for example.

In contrast, in the voice interaction system 2 (FIG. 2) to which the present technology is applied, it is estimated that the certainty factor of the title is low, because the information regarding the schedule title is not included in the user's speech and "What" is asked without including specific designation. In addition, regarding the date and time, it is possible to estimate that the certainty factor is medium because there is no time designated, although "Tomorrow" is designated.

Therefore, it is possible to generate the system response including the details about the title and the date and time, such as "Tomorrow there are the meeting schedule at 10 AM and the shopping schedule at 5 PM," for example. In this manner, issuing more information in the case where the certainty factor is low allows the user to appropriately obtain the information that the user desires in one interaction, and makes addition of extra interaction unnecessary. Thus, it is possible to have the good-paced interaction.

In such a case where the user's certainty factor is low, the contents of the processing performed by the voice interaction system 2 of FIG. 2 are as follows, for example.

That is, the user certainty factor estimation section 212 performs the analysis processing on the speech text data being "What schedule do I have tomorrow?" and the user's certainty factor is thereby obtained. It is estimated here that the certainty factor about the schedule title is low because no specific designation is included. In addition, it is estimated that the certainty factor of the scheduled date and time is medium because no time information is included.

Then, in the output generation unit 205, as the API output, it is obtained that two relevant records are present in the schedules registered in the schedule DB. However, as the user's certainty factor, it is estimated that the certainty factor of the schedule title is low and the certainty factor of the scheduled date and time is medium. Thus, the system response including the more detailed information regarding the title with the low certainty factor is generated.

It is estimated here that, in a case where there is the relationship, such as the function f1 illustrated in FIG. 7, for example, between the user's certainty factor and the amount of information in the system response, it is estimated that the certainty factor of the schedule title is low when the score of the certainty factor being 17, for example, is calculated. Then, as the detailed system response, the response such as "Tomorrow there are the meeting schedule at 10 AM and the shopping schedule at 5 PM," that includes more detailed information regarding the schedule title with the low certainty factor is outputted.

(1-4) A Case Where, Although the User's Certainty Factor Seems High, it is Incorrect as a Fact A case is assumed here that contents about which the user is certain have errors. In this case, it is assumed that the user has said, "I have a meeting schedule at 10 AM the day after tomorrow, don't I?", for example.

At this time, in the general voice interaction system 1 (FIG. 1), it is estimated that the user's intention is the "schedule check" and the arguments thereof are "Title="Meeting"" and "Date and Time="Mar. 24, 2017 10 AM"", and those arguments are passed to the schedule API.

In a case where this schedule API is executed, as the API output, it is obtained that there is zero schedule because no record including such contents is present in the schedules registered in the schedule DB. Then, as the system response, "There is no such a schedule," is obtained, for example.

In contrast, in the voice interaction system 2 (FIG. 2) to which the present technology is applied, it is possible to estimate that the certainty factors of the schedule title and the date and time are high because, similarly to (1-1) "A Case where User's Certainty Factor is High", "Title="Meeting"" and "Date and Time="Mar. 24, 2017 10 AM"" are clearly indicated or no word representing ambiguity such as "Perhaps" or "I suppose" is included in the information.

In addition, here, it is possible to estimate that the user's certainty factor of the date and time was incorrect because the API output obtained by execution of the schedule API with the designated schedule title and date and time as the arguments is zero schedule.

Therefore, it is possible to add the correct information and generate the system response such as "No, the meeting is at 10 AM tomorrow". This makes it possible for the user to obtain the information that the user desires in one interaction without speaking to confirm the correct information again.

(1-5) When there is a Plurality of Choices in a Case Where it is Incorrect as the Fact In the aforementioned (1-4), the example is illustrated where the system response being "No, the meeting is at 10 AM tomorrow" is generated to the speech being "I have a meeting schedule at 10 AM the day after tomorrow, don't I?" It is assumed, however, that addition of the correct information is difficult because for some users, a plurality of meeting schedules is registered in the schedule DB.

In such a case, for example, the voice processing apparatus 10 on side of the user is able to start a calendar application to present the plurality of registered meeting schedules on a monthly basis or on a weekly basis. At this time, the voice processing apparatus 10 may present only schedules close to the "day after tomorrow" included in the speech, for example, other than causing all the registered schedules to be presented.

This allows the user to confirm presentation contents of a calendar and recognize that the user's speech contents have been incorrect, for example, that the user has mistaken the schedule for another meeting schedule, or that the user has forgotten the registration itself that the meeting is scheduled at 10 AM the day after tomorrow. At this time, the user's tendency (that, for example, a certain user often forgets registration of schedules, or the like) may be learned and the tendency may be taken into consideration in the presentation contents of the subsequent calendar.

It is to be noted that, although the case is illustrated where the more compact system response is outputted in the aforementioned (1-1) case where the certainty factor is high or the (1-2) case where the certainty factor is medium, the amount of information in the system response may be increased as far as the good-paced interaction is performed. For example, as the system response of the aforementioned (1-1), the more detailed system response may be outputted by adding a latter part of the response, like, for example, "Yes. There will be the meeting from 10 AM tomorrow," in addition to only "Yes".

(2) Second Embodiment

In the aforementioned first embodiment, description is given of the case where the schedule target person and the user who confirms the schedule through the interaction are the same person. In the following, however, as a second embodiment, description is given of a case where those persons are different.

(Configuration of Voice Interaction System of Present Technology)

FIG. 8 is a block diagram illustrating another configuration example of a voice interaction system to which the present technology is applied.

In FIG. 8, a voice interaction system 3 includes a voice recognition unit 301, a user intention and certainty factor analysis unit 302, an interaction control unit 303, an API call unit 304, an output generation unit 305, and a talker recognition unit 306.

In FIG. 8, units from the voice recognition unit 301 to the output generation unit 305 are configured similarly to the units from the voice recognition unit 201 to the output generation unit 205 illustrated in FIG. 2. That is, as compared to the voice interaction system 2 of FIG. 2, the voice interaction system 3 of FIG. 8 differs in that the talker recognition unit 306 is added to the former stage of the user intention and certainty factor analysis unit 302.

The talker recognition unit 306 recognizes a talker by referring to a talker recognition database and analyzing the user speech data inputted thereto. The talker recognition unit 306 identifies a user ID assigned to the recognized talker and supplies the user ID to the user intention and certainty factor analysis unit 302.

It is to be noted that, in the talker recognition database, for example, for each talker, information that associates the speech data with the user ID is registered in advance. In addition, here, although the case is exemplified where the talker recognition unit 306 identifies the talker on the basis of the user speech data, data to be used to identify the talker is not limited to the user speech data, and, for example, image data of a subject subjected to imaging by the sensor 54, etc. may also be used.

The user intention and certainty factor analysis unit 302 supplies the user ID, the user intention candidate data, and the user certainty factor data to the interaction control unit 303. The interaction control unit 303 estimates the current interaction state and determines the API to be called and the arguments thereof on the basis of the user intention candidate data, the interaction history database, or the like. The interaction control unit 303 supplies the determined API and argument data to the API call unit 304.

In addition, the interaction control unit 303 supplies the user certainty factor data to the output generation unit 305. Here, through the use of the user ID, it is recognized that the user who has spoken is different from the schedule target person, for example. Thus, the interaction control unit 303 passes, to the output generation unit 305, the certainty factor data of a schedule of another person as the user certainty factor data.

The output generation unit 305 generates the response text (system response) to the user on the basis of the user certainty factor data and the API output data, and outputs the response voice corresponding to the voice data. Here, although the amount of information in the system response is controlled (adjusted) in accordance with the certainty factor of the other person's schedule, it is possible to increase the amount of information in the response as compared to the case of the own schedule, because the person checking the schedule through the interaction is different.

In the following, description is given of a specific example of the voice interaction service provided by the voice interaction system 3. It is assumed here that a certain family shares and uses a single scheduler, and that schedules listed in FIG. 9 have already been registered in the schedule DB by the users. The interaction is also assumed that Father (Dad) confirms a Mother's (Mom's) schedule.

In FIG. 9, five schedules are registered as the schedules to be identified by the title, the date and time, the location, and the target person. That is, the meeting at Main Conference Room at 10 AM on Mar. 23, 2017 is registered as the Dad's schedule in the first record. In addition, shopping in Shinjuku at 10 AM on Mar. 23, 2017 is registered as the Mom's schedule in the second record.

In addition, a dentist in Yoyogi at 3 PM on Mar. 23, 2017 is registered as the Dad's schedule in a third record. Furthermore, the shopping in Shibuya at 5 PM on Mar. 23, 2017 is registered as the Dad's schedule in a fourth record. In addition, an alumni reunion in Harajuku at 5 PM on Mar. 23, 2017 is registered as the Mom's schedule in a fifth record.

In the following specific example, it is assumed that the user performs the interaction with the intention to confirm the schedules that have already been registered, on the voice interaction system 3 having such a schedule DB and a schedule API. In the following specific example, however, description is also given of the general voice interaction system 1 (FIG. 1), as appropriate, for comparison.

(2-1) A Case Where a User's Own Certainty Factor about Another Person's Schedule is High It is assumed here that, although the user (Dad) knows that the Mom's schedule of the alumni reunion is at 5 PM tomorrow, the user (Dad) wishes to confirm whether or not it is correct. In this case, it is assumed that the user (Dad) has said, "Mom has the schedule of the alumni reunion at 5 PM tomorrow, doesn't she?", for example.

At this time, in the general voice interaction system 1 (FIG. 1), it is estimated that the user's intention is the "schedule check" and that the arguments thereof are "Title="Alumni Reunion"", "Date and Time=Mar. 23, 2017 5 PM", and "Target Person="Mom"". Those arguments are passed to the schedule API that performs the schedule check.

In a case where this schedule API is executed, as the API output, it is obtained that one record including "Title="Alumni Reunion"", "Date and Time=Mar. 23, 2017 5 PM", "Target Person="Mom"", and "Location="Harajuku"" is present in the schedules registered in the schedule DB.

Then, the system response such as "There is the schedule of the alumni reunion in Harajuku at 5 PM tomorrow", for example, is obtained.

In contrast, the voice interaction system 3 (FIG. 8) to which the present technology is applied, it is estimated how certain (certainty factor) the user is of the information (desired information) that the user desires, on the basis of the information obtained from the user's speech, and the amount of information in the response is controlled (adjusted) in accordance with the estimation result.

In the aforementioned example, because the user speech clearly indicates the schedule title, the date and time, and the target person, or the words qualifying them do not include the words representing ambiguity such as "Perhaps" or "I suppose", it is estimated that the certainty factors thereof are high.

Therefore, generation and output of the compact system response such as "Yes", for example, make it possible to conduct the good-paced interaction.

However, because there was no speech regarding the location of the schedule, it is not possible to determine that the certainty factor about the location is high. In this example, in particular, because the user who has spoken (Dad) is different from the target person of the schedule (Mom), it is considered difficult to assume that the user (Dad) knows about the location in advance.

Therefore, it is desirable to add, to the system response, location information such as "Yes, there is the schedule. The location is Harajuku," for example.

In such a case where the user's own certainty factor about the other person's schedule is high, contents of processing performed by the voice interaction system 3 of FIG. 8 are as follows, for example.

That is, the user certainty factor estimation section 312 performs the analysis processing on the speech text data being "Mom has the schedule of the alumni reunion at 5 PM tomorrow, doesn't she?", and the user's certainty factor about the other person's schedule is thereby obtained. It is estimated here that the certainty factors of the schedule title, the date and time, and the target person are high because the schedule title, the date and time, and the target person are clearly indicated or no word representing ambiguity is included.

Then, in the output generation unit 305, although, as the API output, it is obtained that one relevant record is present in the schedules registered in the schedule DB, the more compact system response is generated because, as the user's certainty factor about the other person's schedule, it is estimated that the certainty factors about the schedule title, the date and time, and the target person are high.

Here, for example, there is a relationship as illustrated in FIG. 10 between the user's certainty factor and the amount of information in the system response, for example. Similarly to FIG. 7, although FIG. 10 illustrates the relationship with the user's certainty factor as the horizontal axis and the amount of information in the system response as the vertical axis, the relationship in the case of own's schedule is expressed by the function f1 and the relationship in the case of the other person's schedule is expressed by a function f2.

That is, in FIG. 10, the function f1 and the function f2 have the same inclination. The function f1 and the function f2 are common in that the function f1 and the function f2 have a negative proportional relationship that while the lower the user's certainty factor is, the larger the amount of response information is, the higher the user's certainty factor is, the smaller the amount of response information is. However, intercepts differ and if certainty factors are the same, the function f2 has the larger amount of response information than the amount of response information of the function f1.

In other words, the other person's schedule is not understood more often than the own schedule. Consequently, even at the equal certainty factors, the amount of response information is changed between the own schedule and the other person's schedule.

It is assumed here that thresholds (Th1 and Th2) are set so that the score equal to or higher than 75 represents the high certainty factor, the score less than 25 represents the low certainty factor, and the score equal to or higher than 25 and less than 75 represents the medium certainty factor.

At this time, for example, when the score of the certainty factor being 90 is calculated, it is estimated that the certainty factors about the schedule title, the date and time, and the target person are high, and it is possible to output the response such as "Yes" as the compact system response. However, because it concerns the other person's schedule, it is desirable to increase the amount of the response information by adding the location information or the like, for example, as "Yes, there is the schedule. The location is Harajuku," for example.

(2-2) A Case Where the User's Own Certainty Factor about Another Person's Schedule is Medium A case is assumed here that, although the user (Dad) knows that Mom has some schedule tomorrow, the user (Dad) is uncertain about the date and time or the content of the schedule. In this case, it is assumed that the user (Dad) has said, "I suppose that Mom goes shopping tomorrow, doesn't she?", for example.

At this time, in the general voice interaction system 1 (FIG. 1), it is estimated that the user's intention is the "schedule check", and the arguments thereof are "Title="Shopping"", "Date and Time="Mar. 23, 2017"", and "Target Person="Mom"". Those arguments are passed to the schedule API.

In a case where this schedule API is executed, as the API output, it is obtained that one record including "Title="Shopping"", "Date and Time="Mar. 23, 2017 10 AM"", "Location="Shinjuku"", and "Target Person="Mom"" is present in the schedules registered in the schedule DB.

Then, the system response such as "There is the shopping schedule in Shinjuku at 10 AM tomorrow", for example, is obtained.

In contrast, in the voice interaction system 3 (FIG. 8) to which the present technology is applied, it is possible to estimate that the certainty factor about the date and time is low because the user's speech does not include the time information and furthermore, "tomorrow" is modified by "I suppose". It is also possible to estimate that the certainty factor about the title is medium because the user's speech includes "Mom goes shopping tomorrow, doesn't she?" It is also possible to estimate that the certainty factor about the location is low because there is no speech about the location.

Therefore, it is possible to return the response including the information with low certainty factor such as "There is the schedule of going shopping to Shinjuku at 10 AM tomorrow", for example. This allows the user to obtain the information that the user desires at once and achieves the smooth communication.

In such a case where the user's own certainty factor about the other person's schedule is medium, the contents of the processing to be performed by the voice interaction system 3 of FIG. 8 are as follows, for example.

That is, the user certainty factor estimation section 312 performs the analysis processing on the speech text data being "I suppose that Mom goes shopping tomorrow, doesn't she?", and the user's certainty factor about the other person's schedule is thereby obtained. It is estimated here that the certainty factor about the date and time is low because the date and time of the schedule does not include the time information, is modified by the words representing ambiguity, or the like. Further, it is estimated that the certainty factor about the title is medium because of the expression included in the user's speech.

Then, in the output generation unit 305, although, as the API output, it is obtained that the relevant one record is present in the schedules registered in the schedule DB, the system response including detailed information regarding the title with the medium certainty factor and the date and time with the low certainty factor is generated, because it is estimated that, as the certainty factor about the other person's schedule, the certainty factor about the date and time of the schedule is low and the certainty factor about the schedule title is medium.

Here, in a case where there is the relationship such as a function f2 illustrated in FIG. 10 between the user's certainty factor about the other person's schedule and the amount of information in the system response, it is estimated that the certainty factor about the schedule title is medium when the score of the certainty factor being 60 is calculated, and the response such as "There is the schedule of going shopping to Shinjuku at 10 AM tomorrow" which includes the detailed information regarding the schedule title with the medium certainty factor is outputted. Here, however, because the schedule is of the other person, the amount of the response information is increased by adding the location information being "Shinjuku".

(2-3) A Case Where the User's Own Certainty Factor about Another Person's Schedule is Low It is assumed here that the user (Dad) does not know the Mom's schedule. In this case, it is assumed that the user has said, "Does Mom have any schedule tomorrow?", for example.

At this time, in the general voice interaction system 1 (FIG. 1), it is estimated that the user's intention is the "schedule check" and the arguments thereof are "Date and Time="Mar. 23, 2017"" and "Target Person="Mom"". Those arguments are passed to the schedule API.

In a case where this schedule API is executed, as the API output, it is obtained that two records, one including "Title="Shopping"", "Date and Time="Mar. 23, 2017 10 AM"", "Location="Shinjuku"", and "Target Person="Mom"" and one including "Title="Alumni Reunion"", "Date and Time="Mar. 23, 2017 5 PM"", "Location="Harajuku"", and "Target Person="Mom"" are present in the schedules registered in the schedule DB.

Then, the system response such as "There are one schedule of going shopping in Shinjuku at 10 AM and the one schedule of the alumni reunion in Harajuku at 5 PM tomorrow", for example, is obtained.

In contrast, in the voice interaction system 3 (FIG. 8) to which the present technology is applied, it is possible to estimate that the certainty factors about the schedule title, the date and time, and the location are low.

Therefore, for example, like "There is one schedule of going shopping in Shinjuku at 10 AM and one schedule of the alumni reunion in Harajuku at 5 PM tomorrow", by presenting the specific information to the information with the user's low certainty factor, it is possible for the user to obtain the information that the user desires at once and it is possible to achieve the smooth communication.

In such a case where the user's certainty factor about the other person's schedule is low, the contents of the processing performed by the voice interaction system 3 in FIG. 8 are as follows, for example.

That is, the user certainty factor estimation section 312 performs the analysis processing on the speech text data being "Does Mom have any schedule tomorrow?", and the user's certainty factor about the other person's schedule is thereby obtained. It is assumed here that the certainty factors about the schedule title, the date and time, and the location are low.

Then, in the output generation unit 305, although, as the API output, it is obtained that the relevant two records are present in the schedules registered in the schedule DB, the system response including more detailed information is generated because it is estimated that, as the user's certainty factor about the other person's schedule, the certainty factors about the schedule title, the date and time, and the location are low.

Here, in a case where there is the relationship such as the function f2 illustrated in FIG. 10 between the user's certainty factor about the other person's schedule and the amount of information in the system response, it is estimated that the certainty factors of the schedule title, the date and time, and the location are low when the score of the certainty factor being 21 is calculated, for example. Then, the response including more detailed information, such as "There is one shopping schedule in Shinjuku at 10 AM and one schedule of the alumni reunion in Harajuku at 5 PM tomorrow" is outputted.

It is to be noted that, in the two examples cited here (cases of (2-2) and (2-3)), there is not a big difference in the system responses made by the general voice interaction system 1 (FIG. 1) and the voice interaction system 3 (FIG. 8) to which the present technology is applied. One reason for this is that being the other person's schedule does not allow for acquisition of implied certainty about the location information, which inevitably lowers a rank of the user's certainty factor and equalizes an amount of information outputted by a general approach of originally outputting more information and the amount of information outputted by an approach of the present technology that adjusts the amount of information in accordance with the user's certainty factor.

It is to be noted that, in such a case of the other person's schedule, the rank of the user's certainty factor becomes lower than that in the case of the own schedule. Consequently, it is also obvious from the relationship of the function f1 and the function f2 illustrated in FIG. 10 that the amount of response information is increased.

(3) Third Embodiment

As described above, regarding an approach of estimating the certainty factor, it is possible to use indices such as whether or not target information is clearly included in the user's speech, whether or not the modification with the words representing ambiguity is performed, or whether or not the information is information of the user who has spoken.

In contrast, it is possible to acquire the relationship between the user's intention and the certainty factor by learning based on a case of the relationship. That is, it is possible to utilize, for example, other voice information, gesture, a line of sight, facial expressions, or the like as well as the speech text.

(Configuration of Voice Interaction System of Present Technology)

FIG. 11 is a block diagram illustrating another configuration example of a voice interaction system to which the present technology is applied.

In FIG. 11, a voice interaction system 4 includes a voice recognition unit 401, a user intention and certainty factor analysis unit 402, an interaction control unit 403, an API call unit 404, an output generation unit 405, a talker recognition unit 406, a gesture recognition unit 407, a line-of-sight recognition unit 408, a face orientation recognition unit 409, and a user position recognition unit 410.

In FIG. 11, units from the voice recognition unit 401 to the output generation unit 405 are configured similarly to the units from the voice recognition unit 201 to the output generation unit 205 illustrated in FIG. 2. In addition, the talker recognition unit 406 is configured similarly to the talker recognition unit 306 illustrated in FIG. 8.

That is, as compared to the voice interaction system 2 of FIG. 2 and the voice interaction system 3 of FIG. 8, the voice interaction system 4 of FIG. 11 differs in that the gesture recognition unit 407, the line-of-sight recognition unit 408, the face orientation recognition unit 409, and the user position recognition unit 410 are added to the former stage of the user intention and certainty factor analysis unit 402.

It is to be noted that, to the gesture recognition unit 407, the line-of-sight recognition unit 408, the face orientation recognition unit 409, and the user position recognition unit 410, inputted is the sensor information (sensor data) detected by the sensor 54 provided in the voice processing apparatus 10 (FIG. 4), for example.

The gesture recognition unit 407 recognizes a user's gesture by performing gesture recognition processing using the sensor data inputted thereto and supplies a result of the recognition to the user intention and certainty factor analysis unit 402. The sensor data used here is, for example, information obtained from various sensors such as a sensor dedicated for detection of the user's gesture or the image sensor for acquiring image data that includes the user as a subject.

The line-of-sight recognition unit 408 recognizes user's line of sight by performing line-of-sight recognition processing using the sensor data inputted to the line-of-sight recognition unit 408 and supplies the result of the recognition to the user intention and certainty factor analysis unit 402. The sensor data used here is, for example, information obtained from various sensors such as a sensor dedicated for detection of the user's line of sight or the image sensor for acquiring the image data that includes the user as a subject.

The face orientation recognition unit 409 recognizes orientation of the user's face by performing face orientation recognition processing using the sensor data inputted thereto and supplies the result of the recognition to the user intention and certainty factor analysis unit 402. The sensor data used here is, for example, information obtained from various sensors such as a sensor dedicated for detection of the orientation of the user's face or the image sensor for acquiring the image data that includes the user as a subject.

The user position recognition unit 410 recognizes a user's position by performing position recognition processing using sensor positional information inputted thereto and supplies the result of the recognition to the user intention and certainty factor analysis unit 402. The sensor data used here is, for example, information obtained from various sensors such as a sensor dedicated for detection of the user's position (for example, a GPS model or the like) or the image sensor for acquiring the image data that includes a subject which allows for identification of the user's location.

To the user intention and certainty factor analysis unit 402, the results of the recognition from the gesture recognition unit 407, the line-of-sight recognition unit 408, the face orientation recognition unit 409, and the user position recognition unit 410, are inputted together with the speech text data from the voice recognition unit 401 and the user ID from the talker recognition unit 406. The user intention and certainty factor analysis unit 402 includes a user intention and analysis section 411 and a user certainty factor estimation section 412.

When performing the analysis processing on the speech text data to estimate the user's certainty factor, the user certainty factor estimation section 412 considers user's behavior based on the recognition results obtained from the sensor data to make it possible to obtain the user's certainty factor. Here, in a case where tendencies as listed below are seen as the user's behavior, for example, it is assumed that the user's behavior corresponds to a case where the user's certainty factor should be lowered.

(a) A speaking speed becomes slow.
(b) A speaking voice becomes high.
(c) The line of sight is not settled.
(d) The user comes directly next to the voice interaction system (voice processing apparatus 10).
(e) The user turns his/her face to a direction of the voice interaction system (voice processing apparatus 10).
(f) An action of gesture with both arms becomes large.
(g) The user is yawning.

In such a case where, for example, the aforementioned tendencies from (a) to (g) are seen as the user's behavior, addition of an algorithm that estimates the certainty factor thereof is low makes it possible to improve accuracy of the estimation of the user's certainty factor. Moreover, the certainty factor may be estimated on the basis of the tendencies obtained by sequentially recording behavior data regarding the user's behaviors and performing learning by using (history of) this behavior data.

It is to be noted that the user's behavior may be any behavior as far as the behavior is recognized on the basis of the sensor data obtained from the sensor 54. The user's behavior may be recognized by utilizing the time information clocked by the clocking means, or the like, in addition to the information regarding the temperatures detected by the temperature sensor or the humidity detected by the humidity sensor, for example. For example, in a case where the time information is used and the user is yawning early morning, it is possible to determine that the certainty factor is low, etc.

As above, description has been given of the first embodiment to the third embodiment. Use of the approaches set forth in these embodiments allows the user to obtain the information that the user desires with the appropriate amount, thus making it possible to achieve the good-paced smooth communications.

It is to be noted that the aforementioned PTL 1 discloses the approach in which the system switches the responses in accordance with the certainty factor of the system itself of the result when the system analyzes the user's speech intention, as a system of switching the responses in accordance with the certainty factor on the side of the system, as the voice interaction system. However, in this approach, there is no mechanism to estimate how certain the user is. Consequently, even in a case where the user's certainty factor is low or in a case where the certainty factor is high, the response having the same amount of information is generated when the certainty factor of the system itself is equal. This does not make it possible to achieve the good-paced smooth communications as the approach set forth in aforementioned embodiments do.

3. MODIFICATION EXAMPLES

In the aforementioned description, description has been given as the processing unit 71 of the server 20 having some of the functions of the voice recognition unit 201, the user intention and certainty factor analysis unit 202, the interaction control unit 203, the API call unit 204, and the output generation unit 205, of the functions provided by the units from the voice recognition unit 201 to the output generation unit 205. However, the processing unit 71 has only to have at least some functions of the functions provided by the units from the voice recognition unit 201 to the output generation unit 205.

In addition, description has been given as the processing unit 51 of the voice processing apparatus 10 having the function to input the user speech data to the voice recognition unit 201 and the function to output the response voice corresponding to the (voice data of) the system response, of the functions provided by the units from the voice recognition unit 201 to the output generation unit 205 that are included. However, the processing unit 51 has only to have at least some functions of the functions provided by the units from the voice recognition unit 201 to the output generation unit 205.

That is, of the functions provided by the units from the voice recognition unit 201 to the output generation unit 205, the functions excluding the functions that the processing unit 71 of the server 20 has are the functions that the processing unit 51 of the voice processing apparatus 10 has.

However, the processing unit 51 of the voice processing apparatus 10 may have all of the functions provided by the units from the voice recognition unit 201 to the output generation unit 205, and the functions of the voice interaction system may be implemented only by the voice processing apparatus 10. Then, the database 73 may be built in the voice processing apparatus 10 or may be provided by the server 20 on the Internet 30.

In addition, although, in the aforementioned description, description has been given of the case where the output generation unit 205 of FIG. 2 (output generation unit 305 of FIG. 8 and output generation unit 405 of FIG. 11) uses the user's certainty factor to control (adjust) the amount of information in the response, another block may perform control of the amount of information in the response using the user's certainty factor.

Now, with reference to FIG. 12 to FIG. 14, description is given next of a modification example of a configuration of a voice interaction system to which the present technology is applied. It is to be noted that, for comparison, description is also given of a general text chat system.

(Configuration of General Text Chat System)

FIG. 12 is a block diagram illustrating a configuration of the general text chat system.

In FIG. 12, a general text chat system 6 includes a user intention analysis unit 602, an interaction control unit 603, an API call unit 604, and an output generation unit 605.

To the user intention analysis unit 602, the text data inputted by the user is supplied by means of text chat. The user intention analysis unit 602 processes the text data to analyze the user's intention and supplies, to the interaction control unit 603, the user intention candidate data obtained as a result of the analysis.

The interaction control unit 603 estimates the current interaction state on the basis of the user intention candidate data supplied from the user intention analysis unit 602 or the like and determines the API to be called and the arguments thereof. The interaction control unit 603 supplies the API and argument data to the API call unit 604.

On the basis of the API and argument data supplied from the interaction control unit 603, the API call unit 604 passes the arguments to the API to be called, executes the API, and supplies, to the output generation unit 605, the API output obtained as a result of the execution.

The output generation unit 605 outputs, as the system response, the information corresponding to the text data or the image data on the basis of the API output supplied from the API call unit 604.

The general text chat system 6 is configured as described above. Here, in the voice interaction system of the present technology (for example, the voice interaction system 2 of FIG. 2), to the user intention and certainty factor analysis unit 202, the text data of the text chat is inputted instead of the speech text data, and processing similar to the processing of the speech text data may also be performed. In this case, the output generation unit 205 outputs the information corresponding to the text data or the image data, as the system response. It is to be noted that, at this time, the voice recognition unit 201 is made unnecessary in the voice interaction system 2 of FIG. 2.

First Modification Example of Configuration of Voice Interaction System of Present Technology FIG. 13 is a block diagram illustrating a first modification example of a voice interaction system to which the present technology is applied.

In FIG. 13, a voice interaction system 7 includes a voice recognition unit 701, a user intention and certainty factor analysis unit 702, an interaction control unit 703, an API call unit 704, and an output generation unit 705.

In FIG. 13, the voice recognition unit 701, the user intention and certainty factor analysis unit 702, and the API call unit 704 are configured similarly to the voice recognition unit 201, the user intention and certainty factor analysis unit 202, and the API call unit 204 illustrated in FIG. 2.

That is, as compared to the voice interaction system 2 of FIG. 2, the voice interaction system 7 of FIG. 13 is different in the functions of the interaction control unit 703 and the output generation unit 705.

Specifically, when estimating the current interaction state and determining the API to be called and the arguments thereof on the basis of the user intention candidate data and the interaction history database, the interaction control unit 703 uses the user certainty factor data to cause an optimal API to be selected. At this time, however, the selectable API is different depending on the amount of information in the response, and the API by which the response having the amount of information corresponding to the user's certainty factor is obtainable is selected.

On the basis of the API and argument data supplied from the interaction control unit 703, the API call unit 704 passes the arguments to the API to be called and executes the API.

The output generation unit 705 generates the system response on the basis of the API output data supplied from the API call unit 704 and outputs the response voice corresponding to that voice data. In the interaction control unit 703, however, the optimal API is selected using the user certainty factor data and the amount of information to be included in the response text has been already adjusted. Consequently, it is not necessary to adjust the amount of information here.

The voice interaction system 7 is configured as described above.

Second Modification Example of Configuration of Voice Interaction System of Present Technology FIG. 14 is a block diagram illustrating a second modification example of the voice interaction system to which the present technology is applied.

In FIG. 14, a voice interaction system 8 includes a voice recognition unit 801, a user intention and certainty factor analysis unit 802, an interaction control unit 803, an API call unit 804, and an output generation unit 805.

In FIG. 14, the voice recognition unit 801 and the user intention and certainty factor analysis unit 802 are configured similarly to the voice recognition unit 201 and the user intention and certainty factor analysis unit 202 illustrated in FIG. 2.

That is, as compared to the voice interaction system 2 of FIG. 2, the voice interaction system 8 of FIG. 14 is different in the functions of the interaction control unit 803, the API call unit 804, and the output generation unit 805.

Specifically, the interaction control unit 803 estimates the current interaction state on the basis of the user intention candidate data, the interaction history database, or the like and determines the API to be called and the arguments thereof. The interaction control unit 803 supplies the API and argument data to the API call unit 804.

On the basis of the API and argument data supplied from the interaction control unit 803, the API call unit 804 passes the arguments to the API to be called, executes the API, and returns, to the interaction control unit 803, the API output obtained as a result of the execution.

On the basis of the user certainty factor data and the API output data, the interaction control unit 803 generates output for which the amount of information to be included in the response text is adjusted and supplies the output to the output generation unit 805.

Here, the system response itself to the user may be generated and outputted, or only the information necessary for generation of the system response may be outputted and the generation of the system response may be left to the output generation unit 805 in the latter stage.

The output generation unit 805 outputs the response voice corresponding to the system response on the basis of the output from the interaction control unit 803. However, it is as stated earlier that the system response may be generated on side of the output generation unit 805.

The voice interaction system 8 is configured as described above.

Meanwhile, in the voice interaction system 2 (FIG. 2), although description has been given of the case where the user speech data is directly inputted to the voice recognition unit 201, the user speech data may be inputted to the voice recognition unit 201 after being processed. Then, in the following, with reference to FIG. 15, description is given of a configuration in which preprocessing is performed on the user speech data.

Third Modification Example of Configuration of Voice Interaction System of Present Technology FIG. 15 is a block diagram illustrating a third modification example of the voice interaction system to which the present technology is applied.

In FIG. 15, the voice interaction system 2 includes the voice recognition unit 201, the user intention and certainty factor analysis unit 202, the interaction control unit 203, the API call unit 204, the output generation unit 205, and a preprocessing unit 221.

In FIG. 15, the units from the voice recognition unit 201 to the output generation unit 205 are configured similarly to the units from the voice recognition unit 201 to the output generation unit 205 illustrated in FIG. 2. That is, as compared to the voice interaction system 2 of FIG. 2, the voice interaction system 2 of FIG. 15 differs in that the preprocessing unit 221 is added to the former stage of the voice recognition unit 201.

The preprocessing unit 221 performs signal processing such as echo cancelling or noise removal, for example, on the voice signal inputted thereto and supplies, to the voice recognition unit 201, user speech data obtained as a result of the signal processing.

Here, for example, the voice processing apparatus 10 has the microphone 52 and the speaker 53. Therefore, the microphone 52 may possibly pick up a sound from the speaker 53. Thus, it is made possible to obtain only the user speech data by performing the signal processing such as the echo cancelling. More specifically, in a case where the voice processing apparatus 10 plays music, the voice signal that is the voice signal from which the music outputted from the speaker 53 is removed and that is acquired by the microphone 52 is obtained as the user speech data.

It is to be noted that, although the preprocessing unit 221 basically has the function that the processing unit 51 of the voice processing apparatus 10 has, the preprocessing unit 221 may have the function that the processing unit 71 of the server 20 has. In that case, the voice processing apparatus 10 transmits the voice signal to the server 20 via the Internet 30, and the signal processing on the voice signal is thereby performed on side of the server 20.

The voice interaction system 2 is configured as described above.

Incidentally, in the aforementioned description, as illustrated in FIG. 7 and FIG. 10, although description has been given as the negative proportional relationship being present between the user's certainty factor and the amount of information in the system response, the relationship is an example, and for example, it suffices if there is a linear or non-linear relationship such as an inverse proportional relationship, or the like.

Then, in the following, with reference to FIG. 16 to FIG. 19, description is given of modification examples of the relationships of the user's certainty factor and the amount of information in the system response. It is to be noted that these relationships may be calculated in accordance with a predetermined algorithm or may be manually defined. In addition, the machine learning that uses data accumulated for each user may be applied.

First Modification Example of Certainty Factor and Amount of Response Information FIG. 16 is a diagram illustrating a first modification example of the relationship of the user's certainty factor and the amount of information in the system response.

It is to be noted that, similarly to FIG. 7 and FIG. 10, FIG. 16 illustrates the relationship of the user's certainty factor and the amount of response information where the horizontal axis represents the user's certainty factor and the vertical axis represents the amount of information in the system response (amount of response information). This also applies to FIG. 17 to FIG. 19 to be described later.

In FIG. 16, a function f3 has the inverse proportional relationship where the higher the user's certainty factor is, the smaller the amount of the response information is, while the lower the user's certainty factor is, the larger the amount of the response information is.

Here, it is possible to set the thresholds (Th1 and Th2) so that, for example, the score equal to or higher than 75 represents the high certainty factor, the score less than 25 represents the low certainty factor, and the score equal to or higher than 25 and less than 75 represents the medium certainty factor.

Second Modification Example of Relationship of Certainty Factor and Amount of Response Information FIG. 17 is a diagram illustrating a second modification example of the relationship of the user's certainty factor and the amount of information in the system response.

In FIG. 17, a function f4 has a step-like relationship where the higher the user's certainty factor is, the smaller the amount of the response information is, while the lower the user's certainty factor is, the larger the amount of the response information is.

Here, by setting, for example, Th1=25 and Th2=75 as the thresholds, the score equal to or higher than 75 represents the high certainty factor, the score less than 25 represents the low certainty factor, and the score equal to or higher than 25 and less than 75 represents the medium certainty factor. However, the amount of the response information is a certain amount of information for each of the high certainty factor, the medium certainty factor, and the low certainty factor because the function f4 has the step-like relationship.

Third Modification Example of Relationship of Certainty Factor and Amount of Response Information FIG. 18 is a diagram illustrating a third modification example of the relationship of the user's certainty factor and the amount of information in the system response.

In FIG. 18, a function f5 has an arcuate relationship where the higher the user's certainty factor is, the smaller the amount of the response information is, while the lower the user's certainty factor is, the larger the amount of the response information is.

Here, by setting, for example, Th1=25 and Th2=75 as the thresholds, the score equal to or higher than 75 represents the high certainty factor, the score less than 25 represents the low certainty factor, and the score equal to or higher than 25 and less than 75 represents the medium certainty factor. However, the amount of the response information slowly varies for each of the high certainty factor, the medium certainty factor, and the low certainty factor, because the function f5 has the arcuate relationship.

Fourth Modification Example of Certainty Factor and Amount of Response Information FIG. 19 is a diagram illustrating a fourth modification example of the relationship of the user's certainty factor and the amount of information in the system response.

In FIG. 19, a function f6 has an S-shaped relationship where the higher the user's certainty factor is, the smaller the amount of the response information is, while the lower the user's certainty factor is, the larger the amount of the response information is.

Here, by setting, for example, Th1=25 and Th2=75 as the thresholds, the score equal to or higher than 75 represents the high certainty factor, the score less than 25 represents the low certainty factor, and the score equal to or higher than 25 and less than 75 represents the medium certainty factor. However, the amount of the response information slowly varies for each of the high certainty factor, the medium certainty factor, and the low certainty factor, because the function f6 has the arcuate relationship.

It is to be noted that, although FIG. 16 to FIG. 19 do not clearly state, similarly to the relationship of FIG. 10, when the function f3 (functions f4, f5, and f6), for example, represents the relationship in the case of the own schedule, the relationship of the other person's schedule is a relationship resulting from shifting the function f3 (functions f4, f5, and f6) to a right direction. Thus, if the certainty factors are equal, it suffices that the amount of the response information is larger for the function representing the other person's schedule than the function f3 (functions f4, f5, and f6) representing the own schedule.

That is, the other person's schedule is not understood more often than the own schedule. Consequently, even at the equal certainty factors, it is possible to change the amount of response information between the own schedule and the other person's schedule.

(Other Examples of API)

In the aforementioned description, although description has been given, as an example, of the schedule API that performs the schedule check as the API corresponding to the user's intention (intention), it is also possible to similarly apply other APIs such as the API that checks news or weather, the API that plays music, or the like, for example. For example, it is possible to call these APIs by an application executed by the voice processing apparatus 10 or the server 20. In addition, in the aforementioned description, description has been given with the title, the date and time, the location, and the target person as the arguments (slots) of the schedule API, by way of example. However, some of the arguments may be deleted or another argument (such as a registrant, for example) may be added.

(Examples of Score of Certainty Factor)

In addition, it is possible to calculate the score of the certainty factor for each user's speech, for example, or for each word included in the user's speech. For example, as the word included in the user's speech, it is possible to calculate the score of the certainty factor of each word corresponding to the arguments such as the title, the date and time, the location, or the target person. Alternatively, for example, the score of the certainty factor of each word corresponding to the arguments such as the title or the date and time may be calculated and counted. As counting here, it is possible to determine a total value, an average value, a maximum value of the scores of the certainty factors, or the like, for example.

4. FLOW OF VOICE INTERACTION PROCESSING

In the following, with reference to the flowchart of FIG. 20, description is given of a flow of the voice interaction processing performed by the voice interaction system 2 (FIG. 2) as an example of the voice interaction processing.

It is to be noted that, of processing steps illustrated in the flowchart of FIG. 20, the steps S11 to S13 are performed by the processing unit 51 of the voice processing apparatus 10 (FIG. 4) and processing of the steps S21 to S27 is performed by the processing unit 71 of the server 20 (FIG. 5).

In step S11, in a case where the user makes a speech, the processing unit 51 receives the speech of the user via the microphone 52. Here, for example, the user's speeches such as "I have a meeting schedule at 10 AM tomorrow, don't I?" or "I suppose that it is tomorrow. Is the meeting scheduled?" are received.

In step S12, the communication I/F 55 transmits the user speech data received in the processing of step S11 to the server 20 via the Internet 30.

The user speech data transmitted from the voice processing apparatus 10 is received by the communication I/F 72 of the server 20, and processing of steps S21 to S27 is performed in the server 20.

In step S21, the voice recognition unit 201 of the processing unit 71 performs the voice recognition processing by referring to the voice-to-text conversion database, and converts the user speech data received from the voice processing apparatus 10 into the speech text data.

In step S22, the user intention analysis section 211 of the processing unit 71 performs user intention analysis processing on the basis of the speech text data obtained in the processing of step S21.

In step S23, the user certainty factor estimation section 212 of the processing unit 71 performs user certainty factor estimation processing on the basis of the speech text data obtained in the processing of step S21.

In step S24, the interaction control unit 203 of the processing unit 71 estimates the current interaction state on the basis of the user intention candidate data obtained in the processing of step S22 and the interaction history database, or the like and determines the API to be called and the arguments thereof.

In step S25, on the basis of the API and argument data obtained in the processing of step S24, the API call unit 204 of the processing unit 71 passes the arguments to the API to be called (for example, the schedule API) and executes the API.

In step S26, on the basis of the user certainty factor data obtained in the processing of step S23 and the API output obtained in the processing of step S25, the output generation unit 205 of the processing unit 71 generates the system response for which the amount of information included in the response text is controlled (adjusted) in accordance with the user's certainty factor.

In step S27, the communication I/F 72 transmits the system response obtained in the processing of step S26 to the voice processing apparatus 10 via the Internet 30.

The processed data (data of the system response) transmitted from the server 20 is received by the communication I/F 55 of the voice processing apparatus 10 and the processing of step S13 is performed in the voice processing apparatus 10.

In step S13, the output generation unit 205 of the processing unit 51 outputs, from the speaker 53, the response voice corresponding to the system response received from the server 20. Here, for example, the compact response voice with the amount of information corresponding to the user's certainty factor such as "Yes", "Yes. It is at 10 AM tomorrow", or the like is outputted. It is to be noted that the processing of controlling (adjusting) the amount of information included in the response text in accordance with the user's certainty factor may also be performed by the output generation unit 205 (for example, the application) of the processing unit 51 on the side of the client.

As above, description has been given of the flow of the voice interaction processing.

5. CONFIGURATION OF COMPUTER

It is possible to perform the aforementioned series of processing (for example, the voice interaction processing illustrated in FIG. 20) by hardware or by software. In a case where the series of processing is performed by the software, a program that configures the software is installed in the computer of each apparatus. FIG. 21 is a block diagram illustrating a configuration example of hardware of a computer that executes the aforementioned series of processing by the program.

In a computer 2000, a CPU (Central Processing Unit) 2001, a ROM (Read Only Memory) 2002, and a RAM (Random Access Memory) 2003 are mutually coupled by a bus 2004. To the bus 2004, an input and output interface 2005 is further coupled. To the input and output interface 2005, an input unit 2006, an output unit 2007, a recording unit 2008, a communication unit 2009, and a drive 2010 are coupled.

The input unit 2006 includes a keyboard, a mouse, a microphone, or the like. The output unit 2007 includes a display, a speaker, or the like. The recording unit 2008 includes a hard disk, a nonvolatile memory, or the like. The communication unit 2009 includes a network interface or the like. The drive 2010 drives a removable recording medium 2011 such as a magnetic disk, an optical disk, a magneto-optical disk, or a semiconductor memory.

In the computer 2000 configured as above, the aforementioned series of processing is performed by the CPU 2001 by loading, to the RAM 2003, a program recorded in the ROM 2002 or the recording unit 2008 via the input and output interface 2005 and the bus 2004, and executing the program.

It is possible to record and provide the program executed by the computer 2000 (CPU 2001) in the removable recording medium 2011 as package media or the like, for example. It is also possible to provide the program via a wired or wireless transmission medium such as a local area network, the Internet, or digital satellite broadcasting.

In the computer 2000, it is possible to install the program in the recording unit 2008 via the input and output interface 2005 by mounting of the removable recording medium 2011 on the drive 2010. It is also possible to receive the program by the communication unit 2009 via the wired or wireless transmission medium, and install the program in the recording unit 2008. In addition, it is also possible to preinstall the program in the ROM 2002 or the recording unit 2008.

Here, in this specification, the processing that the computer performs in accordance with the program is not necessarily performed in chronological order along the order described as the flowchart. That is, the processing that the computer performs in accordance with the program also includes processing performed concurrently or individually (for example, concurrent processing or processing by an object). In addition, the program may be processed by one computer (processor) or may be processed by a plurality of computers in a distributed manner.

It is to be noted that the embodiments of the present technology are not limited to the aforementioned embodiments, and various changes may be made without departing from the gist of the present technology. For example, the present technology may adopt a configuration of cloud computing where a plurality of apparatuses shares and jointly processes one function via a network.

In addition, it is possible to share and perform the respective steps of the voice interaction processing described in the flowchart illustrated in FIG. 20 by the plurality of apparatuses, as well as to perform the respective steps by one apparatus. Furthermore, in a case where one step includes a plurality of processes, it is possible to share and perform the plurality of processes included in that one step by the plurality of apparatuses, in addition to perform the plurality of processes by one apparatus.

It is to be noted that it is possible for the present technology to take configurations as described below.

(1)

An information processor including a processing unit that adjusts an amount of information in a response with respect to desired information of a user, in accordance with a certainty factor of the user himself/herself that is estimated for the desired information.

(2)

The information processor according to (1) described above, in which
the certainty factor is estimated on the basis of information obtained from speech of the user, and
the response is a response to the speech of the user.

(3)

The information processor according to (1) or (2) described above, in which the certainty factor is estimated on the basis of a tendency obtained from behavior of the user, by learning in advance.

(4)

The information processor according to any one of (1) to (3) described above, in which a relationship of the certainty factor and the amount of information included in the response is a linear or non-linear relationship.

(5)

The information processor according to (4) described above, in which the relationship is a proportional or inverse proportional relationship.

(6)

The information processor according to any one of (1) to (5) described above, in which the certainty factor is estimated on the basis of sensor information obtained from a sensor.

(7)

The information processor according to (6) described above, in which the sensor information includes at least any of gesture recognition information, line-of-sight recognition information, face orientation recognition information, and location information, of the user.

(8)

The information processor according to any one of (1) to (7) described above, in which
the desired information is information regarding another user, and
the certainty factor varies depending on a target person of the desired information.

(9)

The information processor according to (8) described above, in which, in a case where the target person is the other user, the certainty factor is lower than that in a case where the target person is the user.

(10)

The information processor according to any one of (1) to (9) described above, in which the response is obtained by passing a value obtained from the desired information to an API (Application Programming Interface) corresponding to an intention of the user, as an argument thereof, and executing the API.

(11)

An information processing method of an information processor, the information processing method including a step of adjusting, by the information processor, an amount of information in a response with respect to desired information of a user, in accordance with a certainty factor of the user himself/herself that is estimated for the desired information.

DESCRIPTION OF REFERENCE NUMERALS 2, 3, 4, 7, 8 voice interaction system, 10 voice processing apparatus, 20 server, 30 Internet, 51 processing unit, 52 microphone, 53 speaker, 54 sensor, 55 communication I/F, 71 processing unit, 72 communication I/F, 73 database, 201 voice recognition unit, 202 user intention and certainty factor analysis unit, 203 interaction control unit, 204 API call unit, 205 output generation unit, 211 user intention analysis section, 212 user certainty estimation section, 221 preprocessing unit, 306 talker recognition unit, 407 gesture recognition unit, 408 line-of-sight recognition unit, 409 face orientation recognition unit, 410 user position recognition unit, 703 interaction control unit, 803 interaction control unit, 2000 computer, 2001 CPU

The invention claimed is:

1. An information processor, comprising:
circuitry configured to:
store, in a memory, desired information;
receive a user input, wherein the user input is associated with the desired information;
estimate a value of a certainty factor based on the user input, wherein the certainty factor indicates certainty of the desired information;
convert the user input into text data; and
output a response based on the desired information and the value of the certainty factor, wherein
the output response includes first content of the desired information based on a first amount of similarity between the text data of the user input and text data of the desired information,
the output response includes second content of the desired information based on a second amount of similarity between the text data of the user input and the text data of the desired information,
the second content of the desired information is different from the first content of the desired information, and
the first amount of similarity between the text data of the user input and the text data of the desired information is different from the second amount of similarity between the text data of the user input and the text data of the desired information.

2. The information processor according to claim 1, wherein
the user input corresponds to user speech,
the value of the certainty factor is estimated based on information of the user speech, and
the output response is a response to the user speech.

3. The information processor according to claim 1, wherein the circuitry is further configured to estimate the certainty factor based on information of a user behavior tendency.

4. The information processor according to claim 1, wherein a relationship of the certainty factor and the output response is one of a linear relationship or a non-linear relationship.

5. The information processor according to claim 4, wherein the relationship is one of a proportional relationship or an inverse proportional relationship.

6. The information processor according to claim 1, wherein the circuitry is further configured to:
obtain sensor information from at least one sensor; and
estimate the value of the certainty factor based on the sensor information.

7. The information processor according to claim 6, wherein the sensor information includes at least one of user gesture recognition information, user line-of-sight recognition information, user face orientation recognition information, or user location information.

8. The information processor according to claim 1, wherein
the desired information is associated with one of a first target or a second target, and
the value of the certainty factor of the first target is different from the value of the certainty factor of the second target.

9. The information processor according to claim 8, wherein the value of the certainty factor of the first target is lower than the value of the certainty factor of the second target.

10. The information processor according to claim 1, wherein the circuitry is further configured to:
pass a specific value of the desired information to an Application Programming Interface (API) corresponding to a user intention, wherein the specific value is passed to the API as an argument of the API; and
execute the API.

11. An information processing method, comprising:
storing, in a memory, desired information;
receiving a user input, wherein the user input is associated with the desired information;
estimating a value of a certainty factor based on the user input, wherein the certainty factor indicates certainty of the desired information;
converting the user input into text data; and
output a response based on the desired information and the value of the certainty factor, wherein
the output response includes first content of the desired information based on a first amount of similarity between the text data of the user input and text data of the desired information,
the output response includes second content of the desired information based on a second amount of similarity between the text data of the user input and the text data of the desired information,
the second content of the desired information is different from the first content of the desired information, and
the first amount of similarity between the text data of the user input and the text data of the desired information is different from the second amount of similarity between the text data of the user input and the text data of the desired information.

* * * * *